United States Patent
Maruyama et al.

(10) Patent No.: US 11,912,882 B2
(45) Date of Patent: Feb. 27, 2024

(54) INK SET

(71) Applicant: Seiko Epson Corporation, Tokyo (JP)

(72) Inventors: Tomoki Maruyama, Matsumoto (JP); Yusuke Mizutaki, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 154 days.

(21) Appl. No.: 17/488,670

(22) Filed: Sep. 29, 2021

(65) Prior Publication Data
US 2022/0098430 A1    Mar. 31, 2022

(30) Foreign Application Priority Data

Sep. 30, 2020 (JP) .................... 2020-165270

(51) Int. Cl.
*C09D 11/40* (2014.01)
*C08K 5/053* (2006.01)
*C09D 11/033* (2014.01)
*C09D 11/328* (2014.01)

(52) U.S. Cl.
CPC .............. *C09D 11/40* (2013.01); *C08K 5/053* (2013.01); *C09D 11/033* (2013.01); *C09D 11/328* (2013.01)

(58) Field of Classification Search
CPC ..... C09D 11/40; C09D 11/033; C09D 11/328; C08K 5/053
See application file for complete search history.

(56) References Cited

U.S. PATENT DOCUMENTS

| | | | |
|---|---|---|---|
| 2008/0257209 A1* | 10/2008 | Kitamura | C09D 11/40 |
| | | | 106/31.48 |
| 2011/0083581 A1* | 4/2011 | Kataoka | C09D 11/40 |
| | | | 106/31.6 |
| 2016/0032125 A1 | 2/2016 | Ohori et al. | |
| 2020/0216701 A1* | 7/2020 | Tateishi | C09B 29/0803 |
| 2021/0292566 A1* | 9/2021 | Nagatsuka | C09D 11/328 |

FOREIGN PATENT DOCUMENTS

JP    2016-029148 A    3/2016

* cited by examiner

*Primary Examiner* — Jennifer A Smith
*Assistant Examiner* — Jeffrey Eugene Barzach
(74) *Attorney, Agent, or Firm* — Harness, Dickey & Pierce, P.L.C.

(57) ABSTRACT

An ink set includes a process color ink set including a yellow ink, a magenta ink, a cyan ink, and a black ink as process color inks, and a light ink having a color similar to a corresponding one of the process color inks in the process color ink set. The yellow ink, the magenta ink, and the cyan ink each have a maximum absorption wavelength, and each have a full width at half maximum of a peak including the maximum absorption wavelength. A maximum absorbance in a visible light wavelength range of the light ink is 70% or less of a maximum absorbance in the visible light wavelength range of the corresponding one of the process color inks.

4 Claims, 15 Drawing Sheets

INK SET

The present application is based on, and claims priority from JP Application Serial Number 2020-165270, filed Sep. 30, 2020, the disclosure of which is hereby incorporated by reference herein in its entirety.

BACKGROUND

1. Technical Field

The present disclosure relates to an ink set.

2. Related Art

An ink jet recording method is capable of recording a high-resolution image with a relatively simple apparatus, and a recording apparatus, ink therefor, and the like have been widely studied. For example, JP-A-2016-029148 discloses an ink set including a yellow ink, a magenta ink, and a cyan ink each containing a specific coloring material. JP-A-2016-029148 describes that such an ink set is excellent in bleeding resistance, initial filling property, and continuous printing property in addition to ozone resistance, light resistance, and humidity resistance.

An image formed by the ink jet recording has a phenomenon in which colors appear to be different depending on a light source illuminating the image when viewed by a human. The phenomenon is referred to as a color difference with different light sources, a metameric match, or metamerism. Further, a phenomenon in which ink dots stand out on a recording medium (graininess) is likely to occur when an achromatic image is formed by using a yellow ink, a magenta ink, and a cyan ink.

In the ink set described in JP-A-2016-029148, the color difference with different light sources and the graininess of an image are not considered, and not all of the various coloring materials disclosed in JP-A-2016-029148 can sufficiently suppress the color difference with different light sources and the graininess. Thus, desired is an ink set capable of reducing the color difference with different light sources and the graininess.

SUMMARY

An ink set according to an aspect of the present disclosure is an ink set including a process color ink set including a yellow ink, a magenta ink, a cyan ink, and a black ink as process color inks, and including a light ink having a color similar to a corresponding one of the process color inks in the process color ink set. The yellow ink has a maximum value of a peak of a maximum absorption wavelength in a range from 350 nm to 480 nm, the magenta ink has a maximum value of a peak of a maximum absorption wavelength in a range from 510 nm to 560 nm, the cyan ink has a maximum value of peak of a maximum absorption wavelength in a range from 580 nm to 700 nm, a full width at half maximum of a peak including the maximum absorption wavelength of the yellow ink is in a range from 85 nm to 100 nm, a full width at half maximum of a peak including the maximum absorption wavelength of the magenta ink is in a range from 85 nm to 100 nm, a full width at half maximum of a peak including the maximum absorption wavelength of the cyan ink is in a range from 118 nm to 165 nm. A maximum absorbance in a visible light wavelength range of the light ink is 70% or less of a maximum absorbance in the visible light wavelength range of the corresponding one of the process color inks.

DESCRIPTION OF EXEMPLARY EMBODIMENTS

Figure 1:
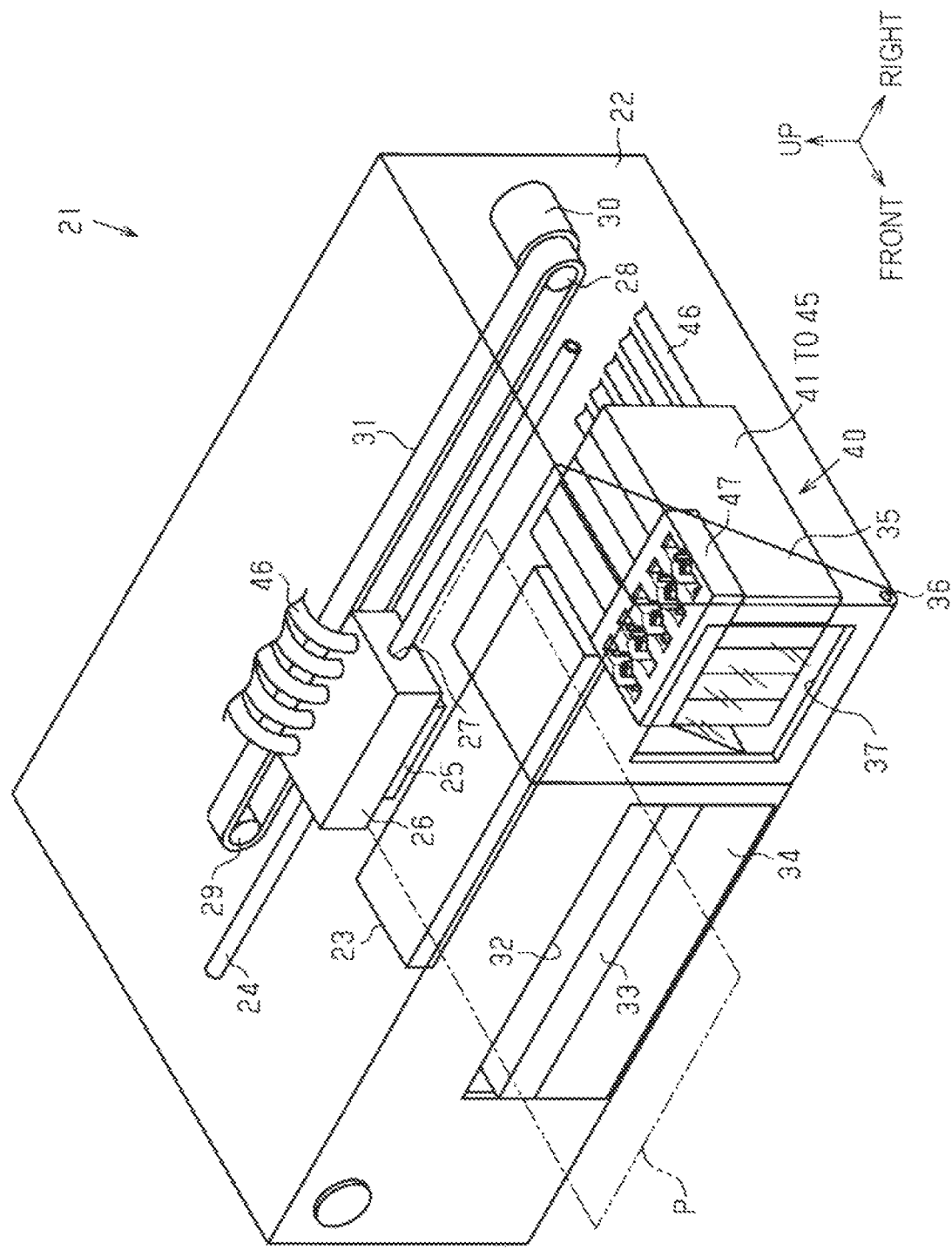
FIG. 1 is a transparent perspective view schematically illustrating an approximate configuration of a recording apparatus according to an embodiment.

An embodiment of the present disclosure will be described below. The embodiment described below illustrates examples of the present disclosure. The present disclosure is not limited to the following embodiment at all, and includes various modifications implemented within a range not changing the gist of the present disclosure. It should be noted that not all of the configurations described below are essential configurations of the present disclosure.

1. Ink Set

An ink set according to the present embodiment includes a process color ink set and a light ink. The number of color inks included in the ink set is not limited as long as the number is five or more.

1.1. Process Color Ink Set

The ink set of the present embodiment includes a process color ink set. The process color ink set includes a yellow ink, a magenta ink, a cyan ink, and a black ink as process color inks.

1.1.1. Yellow Ink

The process color ink set includes a yellow ink. The yellow ink has a maximum absorption wavelength in a range from 350 nm to 480 nm. In the yellow ink, the full width at half maximum of a peak including the maximum absorption wavelength is in a range from 85 nm to 100 nm. Since the full width at half maximum of the peak including the maximum absorption wavelength is 85 nm or more, the color difference with different light sources of an obtained image may be reduced, and since the full width at half maximum of the peak including the maximum absorption wavelength is 100 nm or less, the graininess of an obtained image may be suppressed. In particular, the graininess of an achromatic image using the ink set may be suppressed.

Here, the maximum absorption wavelength refers to a wavelength indicating the maximum absorbance in an absorption spectrum (vertical axis: absorbance, horizontal axis: wavelength) in a visible light region of ink. The visible light region may be from 400 nm to 700 nm.

The absorption spectrum of ink may be measured by a spectrum measurement program using, for example, a spectrophotometer (V-770, manufactured by JASCO Corporation) and may be acquired by attached software (Spectra Manager).

The full width at half maximum of a peak including the maximum absorption wavelength refers to the width at which the absorbance is half of the peak indicating the maximum absorbance in the absorption spectrum in a visible light region of ink.

The yellow ink may have the maximum absorption wavelength in a range from 350 nm to 450 nm. In the yellow ink, the full width at half maximum of the peak including the maximum absorption wavelength may be in a range from 88 nm to 98 nm.

The maximum absorption wavelength and the full width at half maximum of the peak including the maximum absorption wavelength of the yellow ink may be adjusted by selecting the coloring material contained in the yellow ink.

The yellow ink may contain a plurality of kinds of coloring materials as long as the maximum absorption wavelength is in a range from 350 nm to 480 nm, and the full width at half maximum of the peak including the maximum absorption wavelength is in a range from 85 nm to 100 nm.

The coloring material that may be contained in the yellow ink is not limited, and examples thereof include the following dyes.

The yellow ink may contain the compound represented by the following formula (Y-1) or a salt thereof.

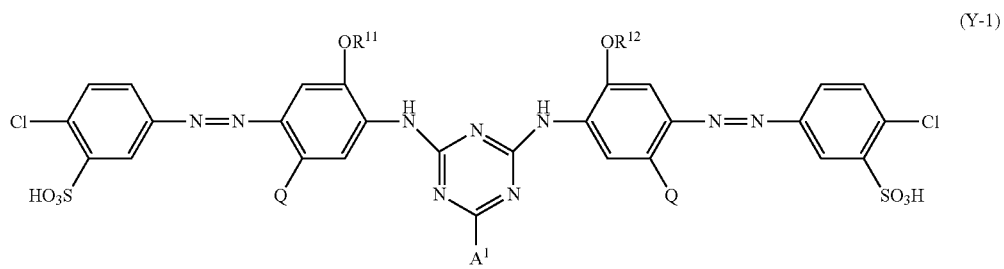

(Y-1)

[In the formula (Y-1), each Q independently represents a halogen atom, and each of $R_{11}$ and $R^{12}$ independently represents an alkyl group substituted with an ionic hydrophilic group. $A^1$ represents a group represented by the following formula (A1-1), a C1-C3 alkoxy-substituted alkylamino group, a mono-C1-C6 alkyl-substituted amino group, a mono-C2-C6 alkyl-substituted amino group having two or more hydroxyl groups, or a cyclic amine group.]

(A1-1)

[In the formula (A1-1), $RA^{11}$ represents a branched alkylene group, and represents the bonding position with a triazine ring.]

Further, in the compound represented by the above formula (Y-1) or a salt thereof, the compound represented by the following formula (Y-1-1) or a salt thereof preferably be included.

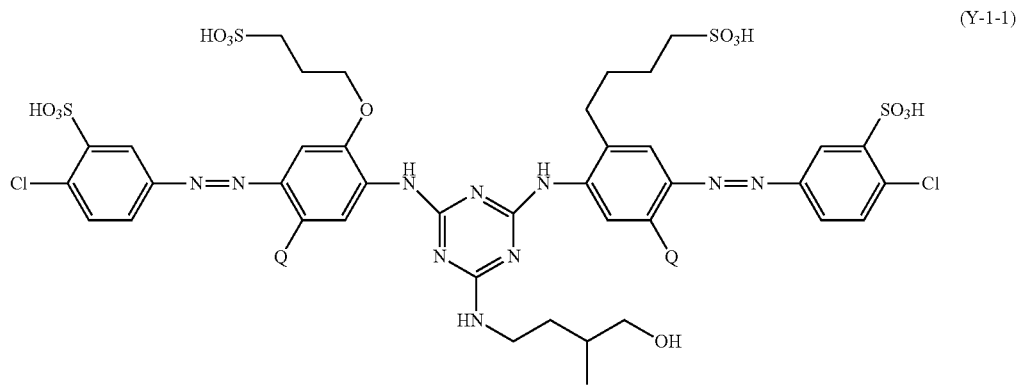
The yellow ink may contain the compound represented by the following formula (Y-2) or a salt thereof.
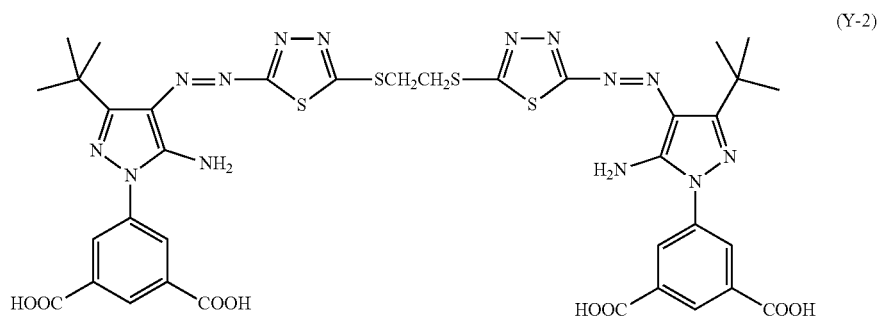
The yellow ink may contain the compound represented by the following formula (Y-3) or a salt thereof.
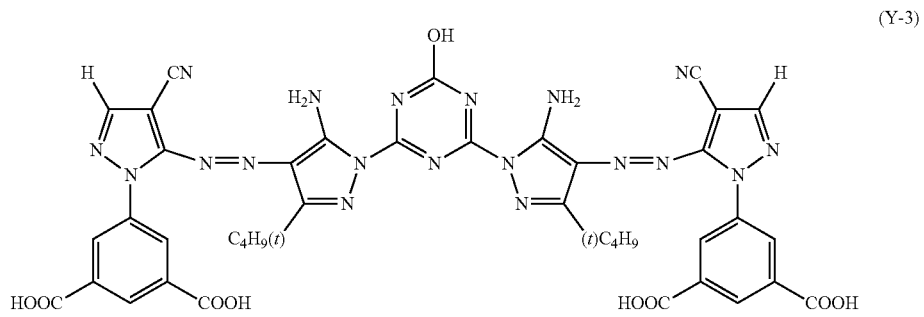
The yellow ink may contain the compound represented by the following formula (Y-4) or a salt thereof.
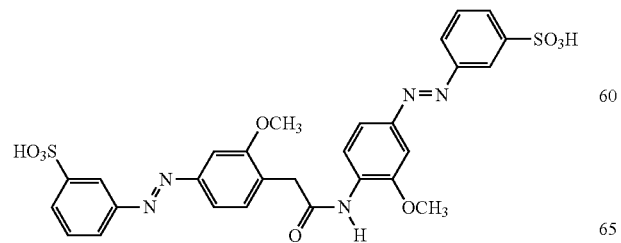

Among the examples described above, it is more preferable that the yellow ink contains the compound represented by the formula (Y-1-1) or a salt thereof, since the maximum absorption wavelength and the full width at half maximum of the peak including the maximum absorption wavelength may easily be set in the range described above. When the yellow ink contains the compound represented by the formula (Y-1-1) or a salt thereof, the color difference with different light sources of an image formed by the ink set may further be reduced. The yellow ink may contain a coloring material other than the coloring materials exemplified above. In that case, the content of the coloring material is, for example, 1.0% by mass or less, preferably 0.5% by mass or less, and more preferably 0.2% by mass or less relative to the total amount of the yellow ink so that the maximum absorption wavelength and the full width at half maximum of the peak including the maximum absorption wavelength fall within the above range.

1.1.2. Magenta Ink

The process color ink set includes a magenta ink. The magenta ink has the maximum value of the peak of a maximum absorption wavelength in a range from 510 nm to 560 nm. Further, the full width at half maximum of the peak including the maximum absorption wavelength of the magenta ink is in a range from 85 nm to 100 nm. Since the full width at half maximum of the peak including the maximum absorption wavelength is 85 nm or more, the color difference with different light sources of an obtained image may be reduced, and since the full width at half maximum of the peak including the maximum absorption wavelength is 100 nm or less, the graininess of an obtained image may be suppressed. In particular, the graininess of an achromatic image using the ink set may be suppressed.

The magenta ink may have the maximum absorption wavelength in a range from 520 nm to 550 nm. Further, the magenta ink may have the full width at half maximum of the peak including the maximum absorption wavelength in a range from 85 nm to 98 nm.

The maximum absorption wavelength and the full width at half maximum of the peak including the maximum absorption wavelength of the magenta ink may be adjusted by selecting the coloring material contained in the magenta ink.

The magenta ink may contain a plurality of kinds of coloring materials as long as the maximum absorption wavelength is in a range from 510 nm to 560 nm, and the full width at half maximum of the peak including the maximum absorption wavelength is in a range from 85 nm to 100 nm.

The coloring material that may be contained in the magenta ink is not limited, and examples thereof include the following dyes.

The magenta ink may contain the compound represented by the following formula (M-1) or a salt thereof.

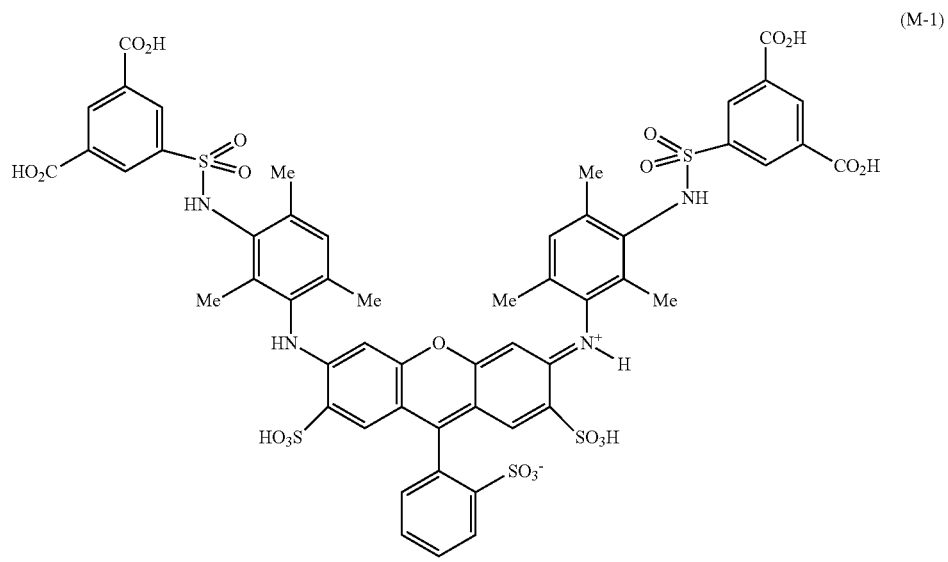

(M-1)

The magenta ink may contain the compound represented by the following formula (M-2) or a salt thereof.

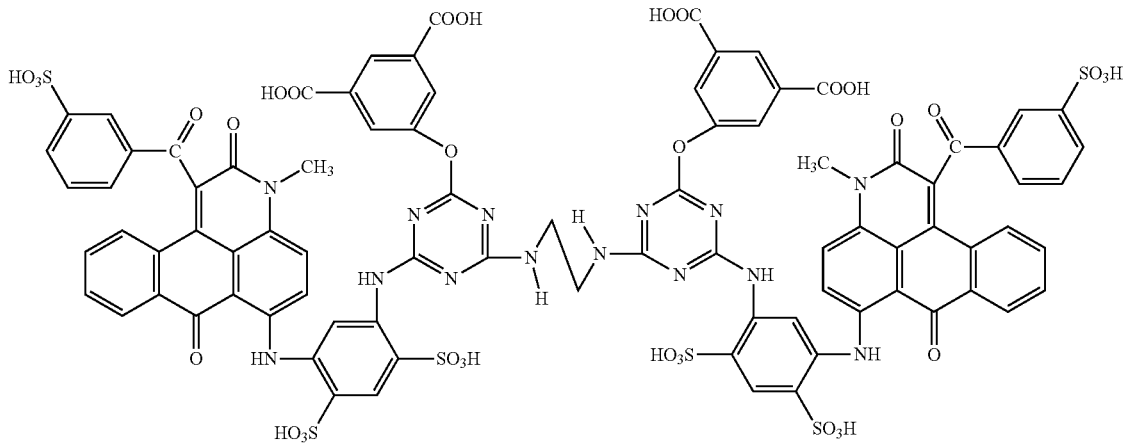

(M-2)

The magenta ink may contain the compound represented by the following formula (M-3) or a salt thereof.

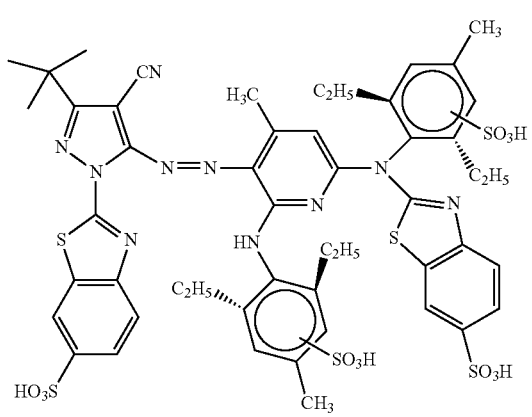

(M-3)

Among the examples described above, it is more preferable that the magenta ink contains at least one of the compound represented by the formula (M-1) or a salt thereof and the compound represented by the formula (M-2) or a salt thereof, since the maximum absorption wavelength and the full width at half maximum of the peak including the maximum absorption wavelength may easily be set in the range described above. When the magenta ink contains at least one of the compound represented by the formula (M-1) or a salt thereof and the compound represented by the formula (M-2) or a salt thereof, the color difference with different light sources of an image formed by the ink set may further be reduced. It is more preferable to contain both of the compound represented by the formula (M-1) or a salt thereof and the compound represented by the formula (M-2) or a salt thereof, and it is still more preferable to further contain the compound represented by the formula (M-3) or a salt thereof. The magenta ink may contain a coloring material other than the coloring materials exemplified above. In that case, the content of the coloring material is, for example, 1.0% by mass or less, preferably 0.5% by mass or less, and more preferably 0.2% by mass or less relative to the total amount of the magenta ink so that the maximum absorption wavelength and the full width at half maximum of the peak including the maximum absorption wavelength fall within the above range.

1.1.3. Cyan Ink

The process color ink set includes a cyan ink. The cyan ink has the maximum value of the peak of a maximum absorption wavelength in a range from 580 nm to 700 nm. Further, the full width at half maximum of the peak including the maximum absorption wavelength of the cyan ink is in a range from 118 nm to 165 nm. Since the full width at half maximum of the peak including the maximum absorption wavelength is 118 nm or more, the color difference with different light sources of an obtained image may be reduced, and since the full width at half maximum of the peak including the maximum absorption wavelength is 165 nm or less, the graininess of an obtained image may be suppressed. In particular, the graininess of an achromatic image using the ink set may be suppressed.

The cyan ink may have the maximum absorption wavelength in a range from 600 nm to 550 nm. Further, the cyan ink may have the full width at half maximum of the peak including the maximum absorption wavelength in a range from 130 nm to 155 nm.

The maximum absorption wavelength and the full width at half maximum of the peak including the maximum absorption wavelength of the cyan ink may be adjusted by selecting the coloring material contained in the cyan ink.

The cyan ink may contain a plurality of kinds of coloring materials as long as the maximum absorption wavelength is in a range from 580 nm to 700 nm, and the full width at half maximum of the peak including the maximum absorption wavelength is in a range from 118 nm to 165 nm.

The coloring material that may be contained in the cyan ink is not limited, but preferably contains a compound including a copper phthalocyanine skeleton or a salt thereof. Thus, it is possible to further reduce the color difference with different light sources of an image formed by the ink set.

Examples of the compound having a copper phthalocyanine skeleton or a salt thereof include the following dyes.

The cyan ink may contain the compound represented by the following formula (C-1) or a salt thereof.

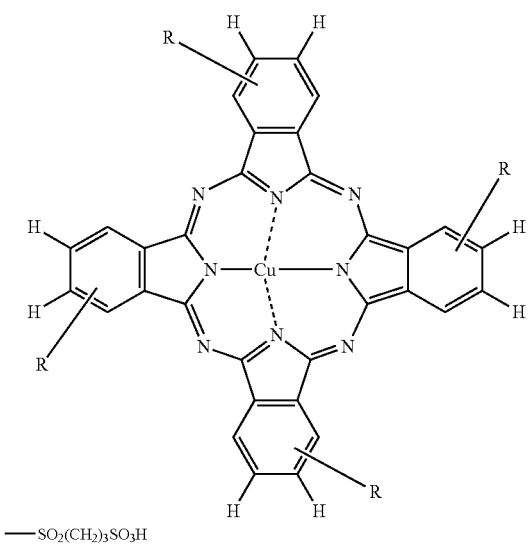

(C-1)

R= —SO₂(CH₂)₃SO₃H

The cyan ink may contain the compound represented by the following formula (C-2) or a salt thereof.

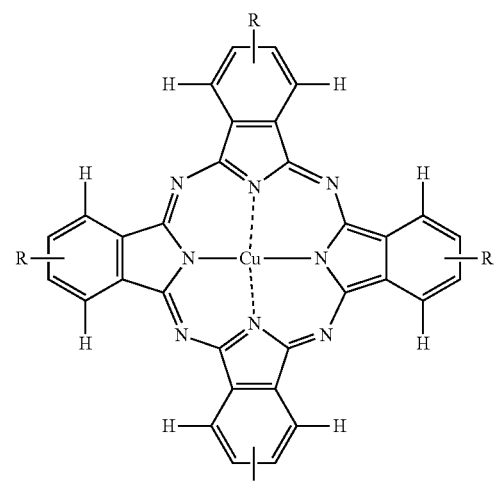

(C-2)

R= —SO₂(CH₂)₃SO₃H / —SO₂(CH₂)₃SO₃NHCH₂CH(OH)CH₃

[2/2]

Among the examples described above, it is more preferable that the cyan ink contains at least one of the compound represented by the formula (C-1) or a salt thereof and the compound represented by the formula (C-2) or a salt thereof, since the maximum absorption wavelength and the full width at half maximum of the peak including the maximum absorption wavelength may easily be set in the range described above. When the cyan ink contains at least one of the compound represented by the formula (C-1) or a salt thereof and the compound represented by the formula (C-2) or a salt thereof, the color difference with different light sources of an image formed by the ink set may further be reduced. It is more preferable to contain both of the compound represented by the formula (C-1) or a salt thereof and the compound represented by the formula (C-2) or a salt thereof. The cyan ink may contain a coloring material other than the coloring materials exemplified above. In that case, the content of the coloring material is, for example, 1.0% by mass or less, preferably 0.5% by mass or less, and more preferably 0.2% by mass or less relative to the total amount of the cyan ink so that the maximum absorption wavelength and the full width at half maximum of the peak including the maximum absorption wavelength fall within the above range.

1.1.4. Black Ink

The process color ink set includes a black ink. The black ink has a role of compensating for the color development of the composite black expressed by, for example, the yellow ink, the magenta ink, and the cyan ink. The coloring material that may be contained in the black ink is not limited, and examples thereof include the following dyes.

The black ink may contain the compound represented by the following formula (B-1) or a salt thereof.

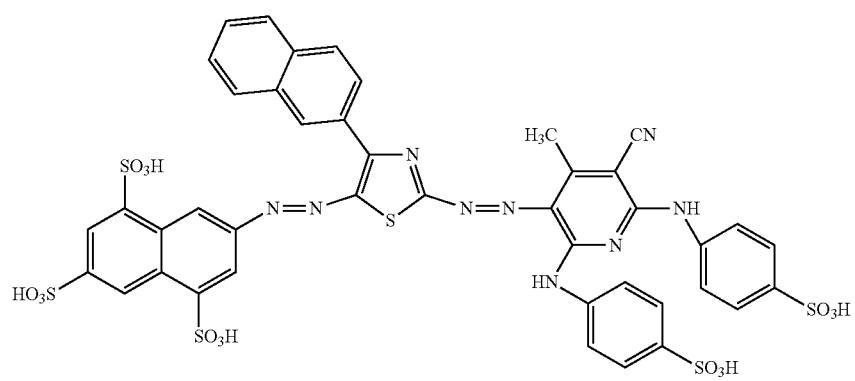

(B-1)

The black ink may contain the compound represented by the following formula (B-2) or a salt thereof.

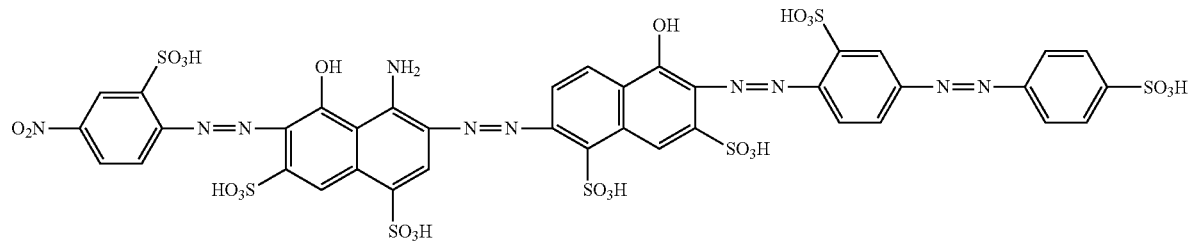

(B-2)

Among the examples described above, the black ink preferably contains the compound represented by the formula (B-1) or a salt thereof because the ozone-resistant fastness of the black ink is enhanced. When a process color ink corresponding to a light ink is the black ink, it is preferable that both of the light ink and the black ink include the compound represented by the formula (B-1) or a salt thereof because the ozone-resistant fastness of an image to be formed may be enhanced. The black ink may contain a coloring material other than the coloring materials exemplified above. In that case, the content of the coloring material is, for example, 1.0% by mass or less, preferably 0.5% by mass or less, and more preferably 0.2% by mass or less relative to the total amount of the black ink.

1.1.5. Other Process Color Inks

The process color ink set includes the yellow ink, the magenta ink, the cyan ink, and the black ink described above, but may include a green ink, an orange ink, a purple ink, or the like as the process color ink.

1.2. Light Ink

The ink set of the present embodiment includes a light ink in addition to the process color ink set. The light ink is a color ink having a color similar to that of a corresponding one of the process color inks of the process color ink set described above, but has a small content of a coloring material.

The light ink has a color corresponding to at least one of the yellow ink, the magenta ink, the cyan ink, and the black ink. The ink set may include a plurality of light inks.

The maximum absorbance in the visible light wavelength range of the light ink is 70% or less of the maximum absorbance in the visible light wavelength range of the corresponding process color ink. By setting the total content of the coloring materials included in one light ink to be lower than the content of the coloring material of the corresponding process color ink, the maximum absorbance of 70% or less of the maximum absorbance of the process color ink may easily be achieved.

Further, the coloring material contained in the light ink may be the same as or different from the coloring material contained in the corresponding process color ink. When the coloring material contained in the light ink is the same as the coloring material contained in the corresponding process color ink, the advantage of the coloring material contained in the process color ink described above may additionally be obtained.

The light ink may be a color corresponding to any of the yellow ink, the magenta ink, the cyan ink, and the black ink, but in particular, preferably corresponds to the black ink. With this, the graininess of an image formed by the ink set may further be reduced. This is because the light black ink has an effect of reducing the contrast of the contour of the ink dot, whereas the black ink tends to sharpen the contrast of the contour of the ink dot because of low brightness.

When the light ink is a light black ink corresponding to a black ink, as in the case of the above-described black ink, the coloring material to be contained is not limited. However, as an example of a preferable dye, at least one of the compound represented by the formula (B-1) or a salt thereof and the compound represented by the formula (B-2) or a salt thereof may be contained. When the black ink contains the compound represented by the formula (B-1) or a salt thereof, the light black ink also preferably contains the compound represented by the formula (B-1) or a salt thereof for the reason described above.

In order to obtain a maximum absorbance of 70% or less of the maximum absorbance of the process color ink, the content of the coloring material in the light ink is preferably less than the content of the coloring material in the corresponding process color ink. For example, the content of the coloring material in the light ink is preferably 60% or less, preferably 40% or less, more preferably 30% or less, and still more preferably 20% or less of the content of the coloring material in the process color ink.

For example, when a light ink is the light black ink and the light black ink contains the compound represented by the formula (B-1) or a salt thereof, the lower limit of the content of the coloring material in the light black ink is 0.3% by mass or more, preferably 0.5% by mass or more, and more preferably 0.7% by mass or more relative to the total amount of the light black ink.

1.3. Salt of Compound

In the present specification, a salt of the compound represented by a chemical formula corresponds to a compound in which at least one H of a plurality of acid groups in the chemical formula is independently replaced by Li, Na, K, or $NH_3$. That is, examples of the salt of the compound represented by the chemical formula in the present specification include a lithium salt, a sodium salt, a potassium salt, an ammonium salt, and a mixed salt thereof. Further, it may be said that the salt of the compound represented by the chemical formula of the present specification releases at least one of a hydrogen ion, a lithium ion, a sodium ion, a potassium ion, and an ammonium ion into an aqueous solution when ionized in the aqueous solution.

1.4. Compositions of Color Inks Other than Coloring Material

The compositions other than the coloring material will be described for the yellow ink, the magenta ink, the cyan ink, the black ink, and the light ink. Since the compositions of color inks are the same except for the coloring material, the color inks are referred to simply as the ink in the following.

The ink may contain a surfactant, an organic solvent, water, and other components.

(1) Surfactant

A surfactant may be added to the ink. The surfactant has a function of lowering the surface tension of ink to enhance the permeability thereof to a recording medium. Examples of the surfactant include a nonionic surfactant, an anionic surfactant, a cationic surfactant, and an amphoteric surfactant, and at least one of these may be adopted.

When the surfactant is added to the ink, the content thereof is 0.01% by mass or more and 3.00% by mass or less relative to the total mass of the ink. The content is preferably 0.05% by mass or more and 2.00% by mass or less, more preferably 0.10% by mass or more and 1.00% by mass or less, and still more preferably 0.20% by mass or more and 0.50% by mass or less. When the content of the surfactant is within the above range, it is possible to suppress foaming to ensure ejection stability during printing, and to improve wetting and spreading (wettability) of the ink at the time the ink adheres to a recording medium.

Examples of the nonionic surfactant include a polyoxyethylene-based surfactant, an acetylene glycol-based surfactant, a fluorosurfactant, and a silicone-based surfactant. With the use of these surfactants in a relatively small content, the wettability to a recording medium may be improved.

The polyoxyethylene-based surfactant is not particularly limited, and examples thereof include polyoxyethylene alkyl ether compound such as Newcol No. 2300 series (such as 2303, 2327, 2399-S), Newcol NT series (such as 3, 5, 7, 9), Newcol No. 1000 series (such as 1004, 1006, 1008, 1203, 1305, 1525) (trade names, NIPPON NYUKAZAI CO., LTD.), EMULGEN 102KG, 103, 104P, 105, 106, 108, 120, 147, 150, 220, 350, 404, 420, 430, 705, 707, 709, 1108, 4085, and 2025G (trade names, Kao Corporation), and polyoxyethylene polyoxypropylene hexyl ether ($C_6H_{13}$-EO—PO—OH).

The acetylene glycol-based surfactant is not particularly limited, but examples thereof include 2,4,7,9-tetramethyl-5-decyne-4,7-diol, alkylene oxide adducts of 2,4,7,9-tetramethyl-5-decyne-4,7-diol, 2,4-dimethyl-5-decyne-4-ol, alkylene oxide adducts of 2,4-dimethyl-5-decyne-4-ol, 3,6-dimethyl-4-octyne-3,6-diol, 3,5-dimethyl-1-hexyne-3-ol, and alkylene oxide adducts of such as 2,4-dimethyl-5-hexyne-3-ol.

As such an acetylene glycol-based surfactant, a commercially available product may be used. Examples thereof include SURFYNOL(registered trademark) 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (trade names, Air Products and Chemicals, Inc.), OLFINE (registered trademark) B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (trade names, Nissin Chemical Industry Co., Ltd), and ACETYLENOL (registered trademark) E00, E00P, E40, and E100 (trade names, Kawaken Fine Chemicals Co., Ltd.).

As the fluorosurfactant, a commercially available product may be adopted, and examples thereof include MEGAFACE (registered trademark) F-479 (trade name, DIC Corporation) and BYK-340 (trade name, BYK Additives & Instruments).

The silicone-based surfactant is not particularly limited, but a polysiloxane-based compound may be adopted. The polysiloxane-based compound is not particularly limited, but examples thereof include polyether-modified organosiloxane. Examples of commercially available products of the polyether-modified organosiloxane include BYK-302, 306, 307, 333, 341, 345, 346, 347, and 348 (trade names, BYK Additives & Instruments), and KF-351A, 352A, 353, 354L, 355A, 615A, 945, 640, 642, 643, 6020, 6011, 6012, 6015, 6017, and X-22-4515 (trade names, Shin-Etsu Chemical Co., Ltd.).

Examples of the anionic surfactant include higher fatty acid salts, soaps, α-sulfo fatty acid methyl ester salts, alkylbenzene sulfonates, alkyl sulfate ester salts, alkyl ether sulfate ester salts, monoalkyl phosphate ester salts, α-olefin sulfonates, alkylnaphthalene sulfonates, naphthalene sulfonates, alkane sulfonates, polyoxyethylene alkyl ether sulfates, sulfosuccinates, and polyoxyalkylene glycol alkyl ether phosphate ester salts.

Examples of the cationic surfactant include quaternary ammonium salt compounds such as alkyltrimethylammonium salts, dialkyldimethylammonium salts, and alkyldimethylbenzylammonium salts; and amine salt compounds such as N-methylbishydroxyethylamine fatty acid ester hydrochlorides.

The amphoteric surfactant is not particularly limited, but examples thereof include amino acid compounds such as alkylamino fatty acid salts.

The above-described surfactants may be used by one kind alone or in combination of two or more kinds.

(2) Organic Solvent

An organic solvent may be added to the ink. Adding an organic solvent makes it possible to control physical properties such as viscosity and surface tension, and behavior such as drying and permeation when the ink is adhered to a recording medium. Examples of the organic solvent include 2-pyrrolidones, 1,2-alkanediols, polyhydric alcohols, and glycol ethers. These may be used by one kind alone or in combination of two or more kinds.

The term "2-pyrrolidones" refers to a compound having a 2-pyrrolidone skeleton. As the 2-pyrrolidones, a compound having a substituent such as N-methyl-2-pyrrolidone, N-ethyl-2-pyrrolidone, or N-vinyl-2-pyrrolidone is used, for example, in addition to 2-pyrrolidone having no substituent. The substituent in the 2-pyrrolidone skeleton is preferably an organic group such as a saturated or unsaturated hydrocarbon group having from one to five carbon atoms. Among these, it is more preferable to use 2-pyrrolidone, which is excellent in the preservation stability of the ink and the effect of suppressing the generation of aggregates.

When the 2-pyrrolidone is added, the content thereof is preferably 0.9% by mass or more and 8.1% by mass or less relative to the total mass of the ink. The content of the 2-pyrrolidone is more preferably 1.0% by mass or more and 8.0% by mass or less relative to the total mass of the ink. When the content of the 2-pyrrolidone is within the range above, an increase in the viscosity of the ink may be suppressed, and the ejection stability of the ink may be improved.

Examples of 1,2-alkanediols include 1,2-propanediol, 1,2-butanediol, 1,2-pentanediol, 1,2-hexanediol, and 1,2-octanediol. The 1,2-alkanediols are excellent in the effect of increasing the wettability of the ink to a recording medium and uniformly wetting the recording medium. With this, a printed matter in which bleeding is suppressed may be produced. When the 1,2-alkanediols are added, the content thereof is preferably 1% by mass or more and 20% by mass or less relative to the total mass of the ink.

Examples of the polyhydric alcohols include ethylene glycol, diethylene glycol, triethylene glycol, propylene glycol, dipropylene glycol, 1,3-propanediol, 1,3-butanediol, 1,3-pentanediol, 1,4-butanediol, 1,5-pentanediol, 1,6-hexanediol, 2,3-butanediol, 3-methyl-1,3-butanediol, 3-methyl-1,5-pentanediol, 2-methyl-1,3-propanediol, 2,2-dimethyl-1,3-propanediol, 2-methyl-2,4-pentanediol, and glycerin. Adding the polyhydric alcohols to the ink makes it possible to suppress drying and solidification of the ink in an ejection nozzle of an ink jet head, and to reduce the clogging of the ejection nozzle, ejection defects, and the like. When the polyhydric alcohols are added, the content thereof is preferably 2% by mass or more and 20% by mass or less relative to the total mass of the ink. Polyhydric alcohols which are solid at 20° C. have the same effect as the polyhydric alcohols of an organic solvent and may be used in the same manner. Examples of the polyhydric alcohols which are solid at 20° C. include trimethylolpropane.

Further, when a polyhydric alcohol having a boiling point of 270° C. or higher is used among the polyhydric alcohols, the function as a humectant is enhanced. With this, evaporation of water in the ink is suppressed. The concentration of the ink, therefore, is suppressed while the ink is preserved or while the ink is left in a state of being put in a recording head, for example, and this reduces the clogging of the nozzle, and further improves the recovery property when the nozzle is clogged, the ejection stability, and the like. Further, since the concentration of the ink is suppressed, the graininess in a formed image may further be suppressed.

Examples of the polyhydric alcohol having a boiling point of 270° C. or higher include glycerin. When a polyhydric alcohol having a boiling point of 270° C. or higher is used, the content thereof is 8.0% by mass or more, preferably 10.0% by mass or more, and more preferably 12.0% by mass or more relative to the total amount of the ink.

Examples of the glycol ethers include alkylene glycol monoether and alkylene glycol diether.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol methyl ethyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

Adding the glycol ethers to the ink makes it possible to adjust the wettability and the permeation rate to a recording medium, and therefore, an image, a pattern, or the like may clearly be formed. When the glycol ethers are added, the content thereof is preferably 0.05% by mass or more and 6% by mass or less relative to the total mass of the ink.

With respect to the above-described organic solvents, a plurality of kinds thereof may be used as a mixture. In that case, the total content of the organic solvents in the ink is 0.2% by mass or more and 30.0% by mass or less, preferably 0.4% by mass or more and 20.0% by mass or less, and more preferably 0.5% by mass or more and 15.0% by mass or less relative to the total mass of the ink. When the total content of the organic solvents is within the range above, it is possible to suppress an increase in the viscosity of the ink, to adjust the behavior (permeation, and wetting and spreading) when the ink is adhered to a recording medium, and to improve the ejection stability during printing.

(3) Water

The ink may contain water. The ink is preferably a water-based system. The water-based system is a composition containing water as one of major solvent components. The water may be contained as a main solvent component, and is a component evaporated and scattered by drying. The water is preferably be pure water such as ion exchanged water, ultra-filtrated water, reverse osmosis water, or distilled water; or ultrapure water in which ionic impurities have been removed as much as possible. Further, it is preferable to use water sterilized by ultraviolet irradiation, addition of hydrogen peroxide, or the like, because the generation of mold or bacteria may be suppressed when the ink is preserved for a long period of time. The content of water is preferably 75.0% by mass or more, more preferably 80.0% by mass or more and 98% by mass or less, and still more preferably 85.0% by mass or more and 95.0% by mass or less relative to the total amount of the ink.

(4) Others

As other components, various additives such as a pH adjusting agent, a preservative, a fungicide, an antioxidant, a chelating agent, and a fixing agent (resin fine particles) may be added to the ink.

Examples of the pH adjusting agent include ureas, amines, morpholines, piperazines, and aminoalcohols including such as two or more kinds thereof. Examples of the ureas include urea, ethyleneurea, tetramethylurea, thiourea, 1,3-dimethyl-2-imidazolidinone and the like, and betaines (trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, acetylcarnitine and the like). Examples of the amines include diethanolamine and triisopropanolamine including two kinds or more thereof. By containing the pH adjusting agent, elution of impurities from the member forming the ink flow path may be suppressed or promoted, and the cleaning property of the ink may be adjusted, for example.

Examples of the fungicide and/or preservative include Proxel CRL, Proxel BDN, Proxel GXL, Proxel XL-2, Proxel IB, and Proxel TN. By containing the fungicide and/or preservative, growth of molds and bacteria may be suppressed, and the preservability of the ink becomes preferable.

Examples of the chelating agent include ethylenediaminetetraacetic acid salts (EDTA), nitrilotriacetic acid salts of ethylenediamine, hexametaphosphates, pyrophosphates, and metaphosphates.

1.5. Physical Properties and Preparation of Ink

The surface tension of the ink at 25° C. is preferably in a range from 10 mN/m to 40 mN/m. The surface tension of the ink at 25° C. is more preferably in a range from 20 mN/m to 40 mN/m, and still more preferably in a range from 20 mN/m to 35 mN/m. When the surface tension at 25° C. is within the range above, the ejection stability of the ink from the ejection nozzle during printing is improved. Note that the surface tension of the ink may be measured using, for example, an automatic surface tensiometer CBVP-Z (Kyowa Interface Science Co., Ltd.) by immersing a part of a platinum plate into the ink in an environment of 25° C.

The ink is adhered to a recording medium such as paper, film, or fabric by an ink jet method. The viscosity of the ink at 20° C., therefore, is preferably in a range from 2 mPa·s (millipascal·second) to 15 mPa·s. The viscosity of the ink at 20° C. is more preferably in a range from 2 mPa·s to 10 mPa·s, and still more preferably in a range from 3 mPa·s to 6 mPa·s. The viscosity of the ink may be measured using, for example, a viscoelasticity tester MCR-300 (Pysica Corporation). Specifically, the viscosity is measured by adjusting the temperature of the ink to 20° C. and by reading the viscosity at the shear rate of 200 during increasing the shear rate from 10 to 1000.

The ink of the present embodiment may be prepared by mixing the above-described components in an arbitrary order, and removing such as impurities or foreign substances with filtration or the like as necessary. A mixing method of the respective components is that the materials are sequentially added to a container equipped with a stirring device such as a mechanical stirrer or a magnetic stirrer, followed by stirring and mixing. Examples of the method of the filtration include centrifugal filtration and filter filtration.

1.6. Operational Effect

In the ink set of the present embodiment, the full width at half maximum of the peak including the maximum absorption wavelength of the process color ink of the process color ink set is in a specific range. This makes it possible to suppress the color difference with different light sources of an obtained image to be small even when the spectrum of light from the light source changes. Further, with the use of the ink set of the present embodiment, the light ink reduces the contrast of the contour of a dot formed on a recording medium, and thus, an image having suppressed graininess may be formed.

1.7. Use of Ink Set and Others

The ink set of the present embodiment may be used in a recording apparatus including a filling port capable of opening and closing, a liquid containing portion containing a liquid, and a recording head ejecting the liquid. In the recording apparatus, the liquid is contained in a container separate from the recording apparatus, the liquid containing portion is filled with the liquid from the container via the liquid filling port, and the container is coupled to the recording apparatus only when the liquid containing portion is filled with the liquid. In this case, the liquid may be a process color ink or a light ink. In a recording apparatus including a filling port capable of opening and closing, water evaporation particularly from a liquid filling port is likely to occur, and ink may be concentrated. In line with the further requirement for the suppression of graininess in an image to be formed, the ink set according to the present embodiment may form an image with suppressed graininess even when the recording apparatus including the filling port capable of opening and closing is used.

Hereinafter, there will be described an example of a recording apparatus suitable for using the ink set of the present embodiment. Note that, the ink container of the recording apparatus described below is a bottle for replenishing an ink composition to an ink tank of an ink jet printer (recording apparatus) that performs recording (printing) of an image or the like on a medium by ejecting ink onto the medium. The bottle corresponds to the container separate from the recording apparatus.

Further, an ink inlet 53 corresponds to the filling port capable of opening and closing, ink tanks 41 to 45 correspond to the liquid containing portion containing liquid, and a recording head 25 corresponds to the recording head to eject liquid.

As illustrated in FIG. 1, a recording apparatus 21 includes a housing 22 having a rectangular parallelepiped shape whose longitudinal direction is the right and left direction. In FIG. 1, the inside of the housing 22 of the recording apparatus 21 is illustrated simply in a transparent state. A support base 23 having a longitudinal direction thereof in the right and left direction is provided at a lower portion near the rear side in the housing 22 such that the upper surface of the support base 23 is substantially parallel to a horizontal direction. A sheet of paper P, which is an example of a medium, is supported on the upper surface of the support base 23 and is transported to the forward side which is the transport direction. A guide shaft 24 extending along the right and left direction is provided above the support base 23 in the housing 22, and the guide shaft 24 supports a carriage 26 having the recording head 25 for ejecting ink under the lower surface side of the carriage 26. That is, the guide shaft 24 is inserted into a support hole 27 penetrating through the carriage 26 in the right and left direction, and the carriage 26 is supported to be able to freely reciprocate in the right and left direction along the guide shaft 24.

A driving pulley 28 and a driven pulley 29 are rotatably supported at positions near both ends of the guide shaft 24 in the housing 22. An output shaft of a carriage motor 30 is coupled to the driving pulley 28, and an endless timing belt 31 partially coupled to the carriage 26 is wound between the driving pulley 28 and the driven pulley 29. The carriage 26 reciprocates along the right and left direction, which is the scanning direction on the sheet of paper P, by being driven by the carriage motor 30 via the timing belt 31 and guided by the guide shaft 24. While the reciprocation, ink is ejected onto the sheet of paper P, being transported forward on the support base 23, from the recording head 25 under the lower surface side of the carriage 26.

As illustrated in FIG. 1, a rectangular discharge port 32 is opened at a position on the front side of the support base 23 in the front surface side of the housing 22. The sheet of paper P, which is recorded by the ink ejected from the recording head 25 while being transported on the support base 23 in the housing 22, is discharged to the front side through the discharge port 32. The discharge port 32 is provided with a rectangular plate-shaped discharge tray 33 capable of supporting the sheet of paper P discharged from the inside of the housing 22. The discharge tray 33 is provided in a manner capable of protruding to the forward side which is the discharge direction, and retracting. In the discharge port 32, a paper feed cassette 34 is provided to the lower side of the discharge tray 33 in a manner capable of inserting and removing in a front/rear direction. The paper feed cassette 34 is capable of storing a plurality of sheets of paper P used for recording in a stacked state.

As illustrated in FIG. 1, in the front surface of the housing 22, an opening/closing door 35 is provided at a position in the end portion side (right end portion side in FIG. 1) relative to the discharge port 32 in the right and left direction. The opening/closing door 35 has a rectangular shape in the front surface and the upper surface thereof and has a right-angled triangle shape in the right-side surface thereof. The opening/closing door 35 is capable of opening and closing in the front/rear direction with a rotation shaft 36, which is provided at a lower end of the opening/closing door 35 along the right and left direction, being the rotational center. A window portion 37 made of a rectangular transparent member is formed on the front surface of the opening/closing door 35, and a user can visually recognize the inside of the housing 22 (in particular, the back side of the front surface of the opening/closing door 35) with the opening/closing door 35 being closed.

In the housing 22 of the recording apparatus 21, an ink supply unit 40 that supplies ink to the recording head 25 is accommodated at a position in the back side of the opening/closing door 35, that is, at a position close to the front surface and close to the end portion (in this case, close to the right end portion). The ink supply unit 40 is a structure that includes a plurality of (five in the present embodiment) ink tanks 41 to 45 and can be handled integrally, and as described later, ink can be replenished to each of the ink tanks 41 to 45.

Figure 2:
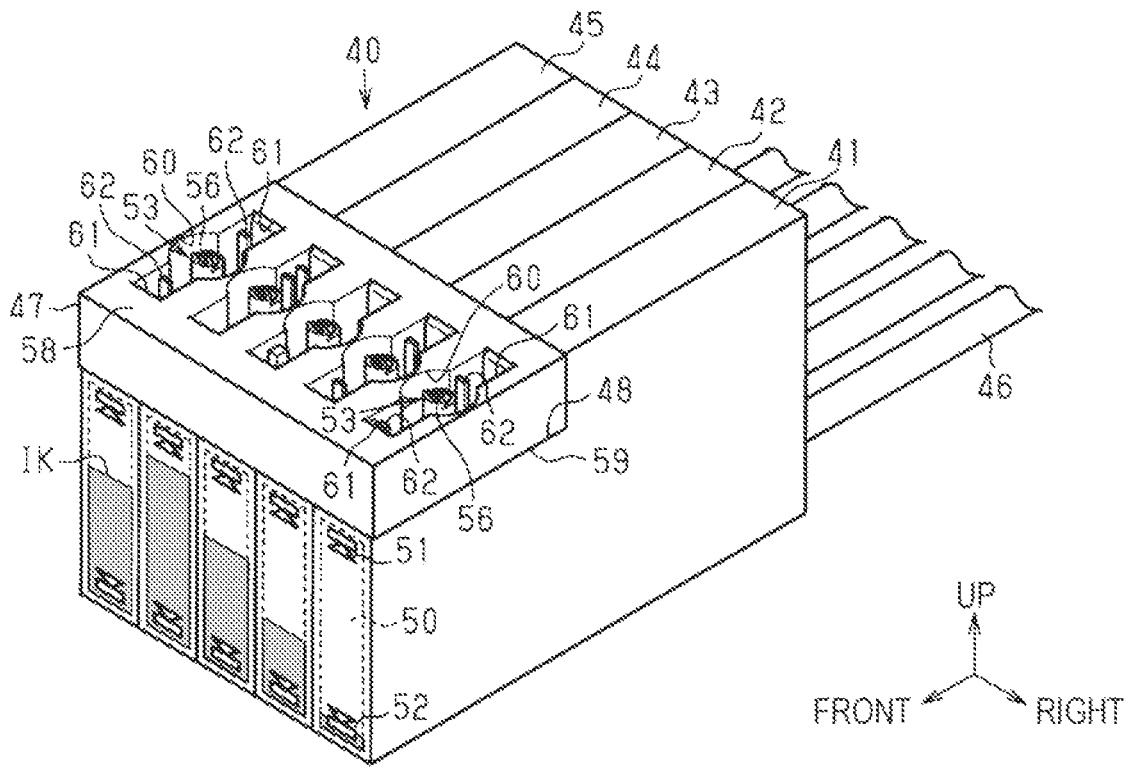
FIG. 2 is a perspective view of an ink supply unit provided in a housing of the recording apparatus.
Figure 3:
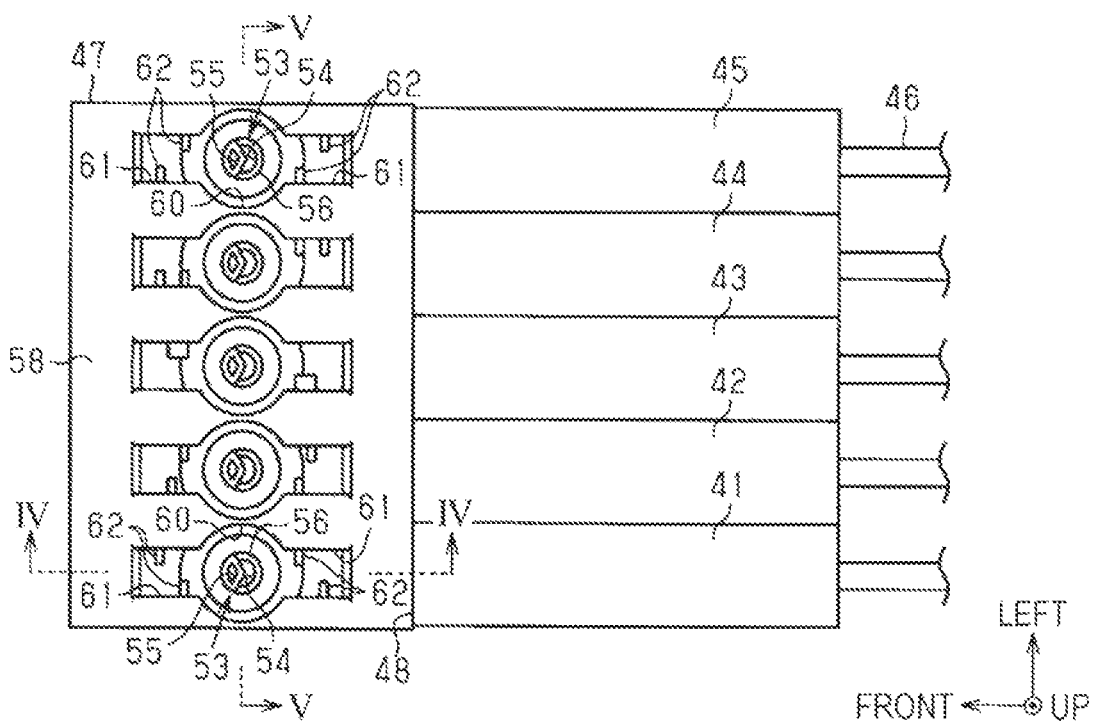
FIG. 3 is a plan view of the same ink supply unit.

As illustrated in FIG. 2 and FIG. 3, the ink supply unit 40 includes five ink tanks 41 to 45 having a deformed box shape elongated in the front/rear direction, five ink supply tubes 46 drawn out from the rear surface sides of the ink tanks 41 to 45, and an ink replenishment adapter 47 having a rectangular parallelepiped shape attached to the ink tanks 41 to 45 in a state assembled together. A step portion 48 is formed by cutting out a front half portion of an upper portion of each of all the ink tanks 41 to 45, and the ink replenishment adapter 47 is attached to the step portion 48 in a state in which all the ink tanks 41 to 45 are arranged side by side with a thickness direction being the right and left direction. Thus, the ink replenishment adapter 47 is integrated with the ink tanks 41 to 45. As illustrated in FIG. 1, the ink supply tube 46 drawn out from each of the ink tanks 41 to 45 is coupled to an ink flow path (not illustrated) formed in the carriage 26, and is coupled to the recording head 25 via the ink flow path. The ink replenishment adapter 47 may constitute a part of the housing 22 covering the ink tanks 41 to 45, or may integrally be formed with the ink tanks 41 to 45.

Figure 4:
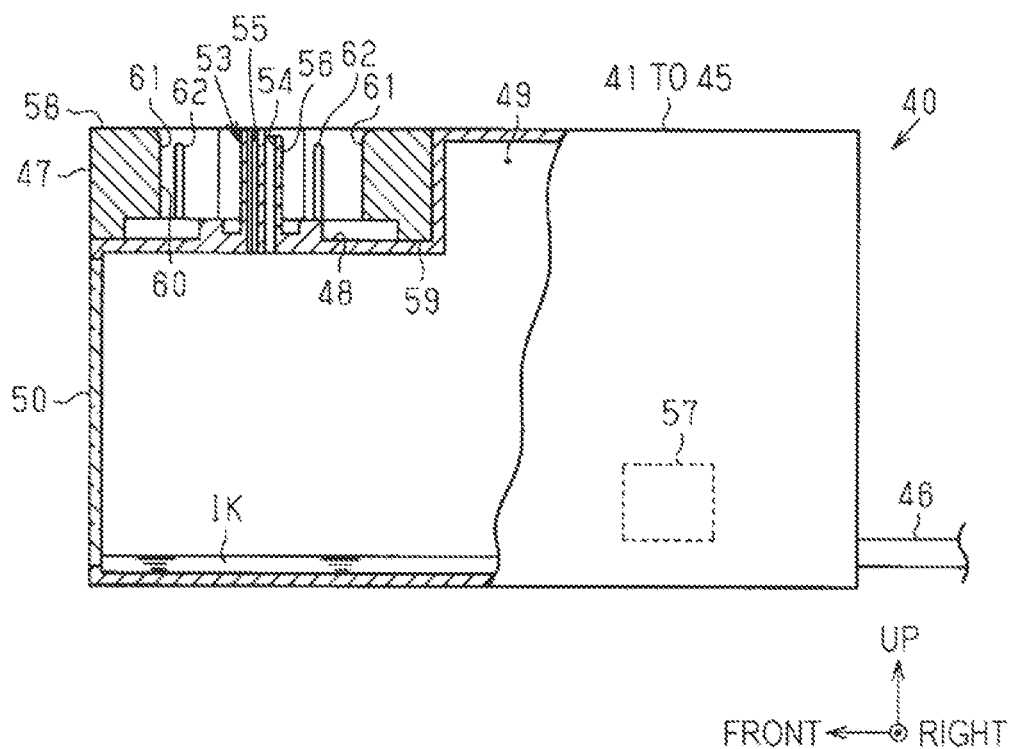
FIG. 4 is a partially broken sectional view taken along line IV-IV in FIG. 3.
Figure 5:
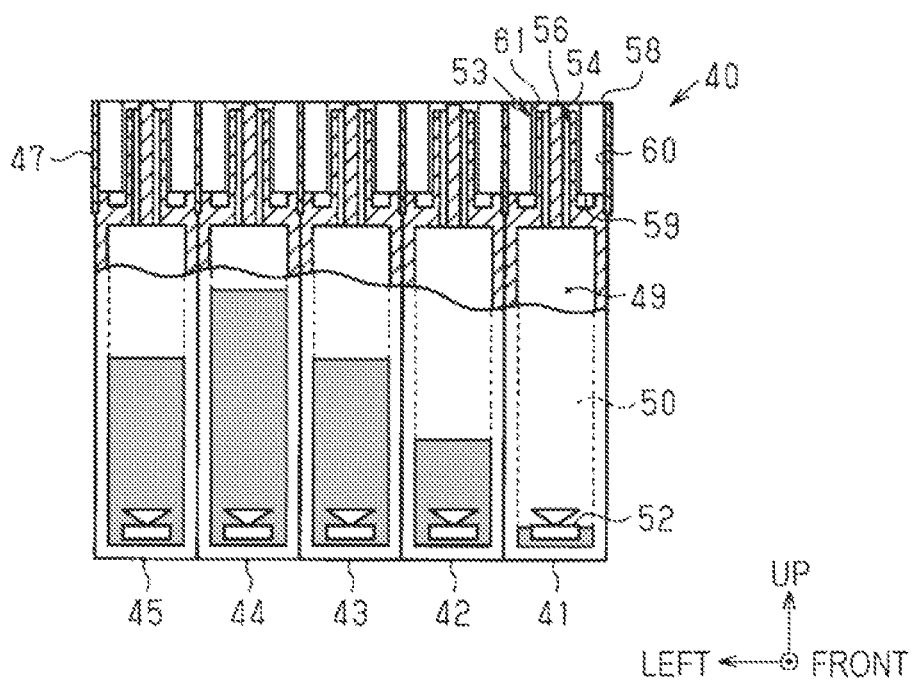
FIG. 5 is a partially broken sectional view taken along line V-V in FIG. 3.

As illustrated in FIG. 4 and FIG. 5, each of the ink tanks 41 to 45 has an ink storage chamber 49 capable of storing an ink composition IK therein. In the present embodiment, a black ink, for example, is stored in the ink storage chamber 49 of the ink tank 41 positioned at the right end in a side by side direction. A color ink other than black (cyan, magenta, yellow, light, and the like) is stored in the ink storage chamber 49 of each of the ink tanks 42 to 45 arranged on the left side of the ink tank 41 at the right end in the side by side direction. Further, a visible portion 50 formed of a transparent resin, which enables the liquid level of the ink composition IK in the ink storage chamber 49 to be visible, is provided to the ink tanks 41 to 45. Specifically, the visible portion 50 is provided to each of the ink tanks 41 to 45 in a front wall portion which is visible through the window portion 37 on the front surface of the housing 22. An upper limit mark 51 and a lower limit mark 52, which indicate the guide of the liquid level of the ink composition IK stored in the ink storage chamber 49, are marked on the visible portion 50. The upper limit mark 51 indicates the upper limit guide (example of the guide for the amount of ink to be filled without spilling from the ink inlet 53), and the lower limit mark 52 indicates the lower limit guide (guide for encouraging the replenishment of ink, for example).

As illustrated in FIG. 4, the ink inlet 53 that allows ink to flow into the ink storage chamber 49 from the outside is provided on the upper side of the horizontal portion of the step portion 48 in each of the ink tanks 41 to 45. The ink inlet 53 includes a needle 56 which has flow paths 54 and 55 communicating the inside and the outside of the ink storage chamber 49 and extends vertically upward. The flow paths 54 and 55 of the needle 56 are composed of two flow paths each having a tip opening arranged side by side in a radial direction with the needle 56 being the center. The flow path 54, which is one side (right side in FIG. 4) of the two flow paths 54 and 55, is formed to have a tip opening height lower than that of the flow path 55, and is formed to have a sectional area larger than that of the flow path 55 on the other side (left side in FIG. 4). A remaining amount sensor 57 for detecting the remaining amount of the ink composition IK in the ink storage chamber 49 is provided in the lower portion near the rear side in the ink storage chamber 49. Note that the remaining amount sensor 57 may not be provided.

As illustrated in FIG. 2 to FIG. 5, an upper surface 58 of the ink replenishment adapter 47 has a horizontal surface parallel to a direction orthogonal (intersecting) to the direction in which the needle 56 extends, and a through-hole 60 penetrating through the ink replenishment adapter 47 in the up-down direction to a lower surface 59 is formed as an ink inlet forming portion in the upper surface 58. The through-hole 60 is configured of the ink inlet 53 having a circular hole shape in which the needle 56 is disposed at the center, and a pair of front/rear rectangular hole portions adjacent to the front/rear of the ink inlet 53. An opening on the lower side of the through-hole 60 is closed by the horizontal portion of the step portion 48 from which the needle 56 protrudes upward in the ink tanks 41 to 45.

In the through-hole 60, therefore, a pair of front/rear recessed portions 61 opening toward the upper side, being the extending direction of the needle 56, are formed by a pair of front/rear rectangular hole portions in a region outside the ink inlet 53 in the radial direction with the ink inlet 53 being the center. The recessed portions 61 are formed to be recessed toward the vertically lower side, being a depth direction, in a point-symmetry with the ink inlet 53 being the center. That is, in the ink replenishment adapter 47 integrated with the ink tanks 41 to 45, the plurality of (in this case, two of front/rear making a pair) recessed portions 61, which is in the point-symmetry with the ink inlet 53 being the center, is formed in the region outside the ink inlet 53 including the needle 56. In this case, the tip of the needle 56, disposed at the center of the ink inlet 53 having a circular hole shape, is positioned in the ink storage chamber 49 side relative to the upper surface 58 of the ink replenishment adapter 47. The upper surface 58 serves as an opening edge of the through-hole 60 including the ink inlet 53 and the recessed portions 61. That is, the upper surface 58 of the ink replenishment adapter 47 extends in a direction intersecting with the extending direction of the needle 56, at a position outer side relative to the tip of the needle 56 in the extending direction of the needle 56. Whereas, the lower surface 59 of the ink replenishment adapter 47 functions as a tank engagement portion that collectively engages the plurality of ink tanks 41 to 45 arranged side by side in the right and left direction from the above.

Further, in the upper surface 58 of the ink replenishment adapter 47, a peripheral portion of the opening edge in the upper side of each through-hole 60 is colored in a specific color. That is, the peripheral portion above is colored in the same color as the color of the ink stored in the ink storage chamber 49 of each of the ink tanks 41 to 45 into which the ink flows via the ink inlet 53 of the through-hole 60.

Further, a first uneven portion (first key structure portion) 62 having a characteristic uneven shape in the horizontal direction is provided in the inner surface (specifically, inner surface along the up-down direction) of the recessed portion 61. Specifically, the first uneven portion 62 is provided at a position in the bottom surface side (that is, the horizontal portion side of the step portion 48) relative to the opening edge in the upper side of the recessed portion 61 so as to extend along the depth direction of the recessed portion 61 (in other words, the direction of the central axis of the ink inlet 53). As illustrated in FIG. 2 and FIG. 3, the first uneven portion 62 is provided to each of the ink inlets 53 of the plurality of (five in the present embodiment) ink tanks 41 to 45. In the ink replenishment adapter 47, the rectangular recessed portion 61 is provided to each through-hole 60 formed at a position corresponding to each of the ink tanks 41 to 45 in the up-down direction. In the rectangular recessed portion 61 of each through-hole 60, formed is the first uneven portion 62 different from the first uneven portion 62 provided on the inner surface of the recessed portion 61 of another through-hole 60. That is, these first uneven portions 62 function as an identification portion capable of identifying an ink container 63 (see FIG. 6 and the like). The ink container 63 has an ink outlet 65 (see FIG. 6 and the like) to be coupled to the ink inlet 53 in the through-hole 60 in which the first uneven portion 62 is formed. The "position in the bottom surface side relative to the opening edge in the upper side of the recessed portion 61" means that the position is retracted even slightly toward the bottom surface side relative to the opening edge.

Next, the ink container 63 will be described as an ink replenishment container constituting an ink replenishment system together with the ink tanks 41 to 45 and replenishing ink to the ink tanks 41 to 45 with little remaining amount of ink. In the ink container 63, the ink composition described above is contained.

Figure 6:
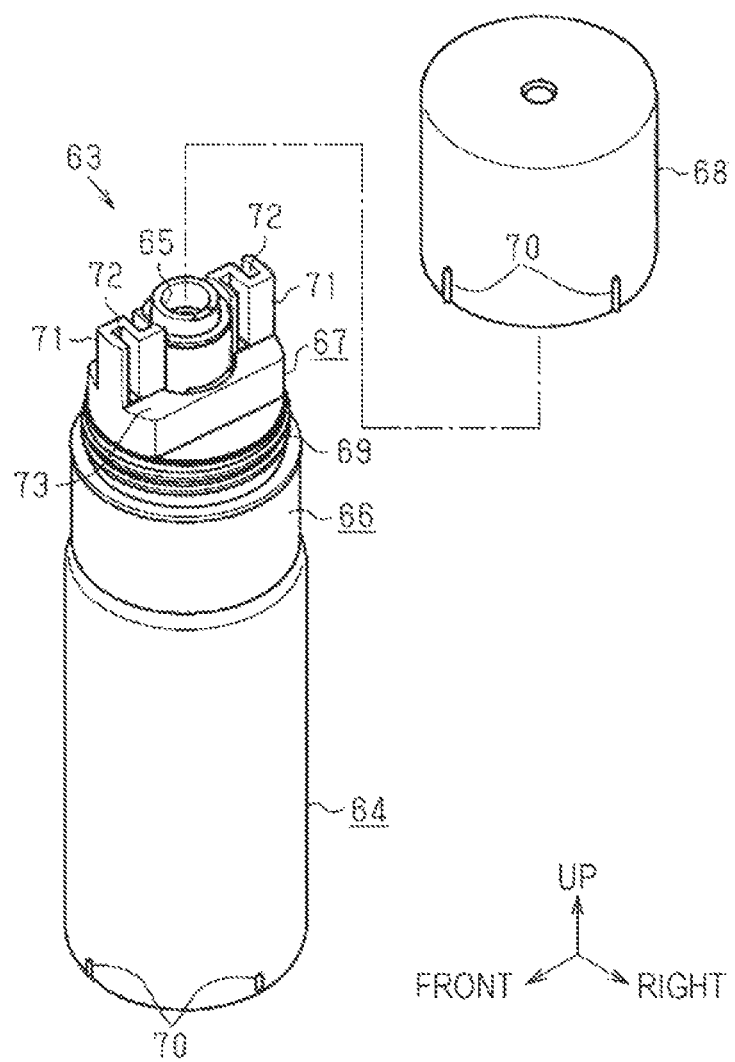
FIG. 6 is a perspective view of an ink container with a cap removed.
Figure 7:
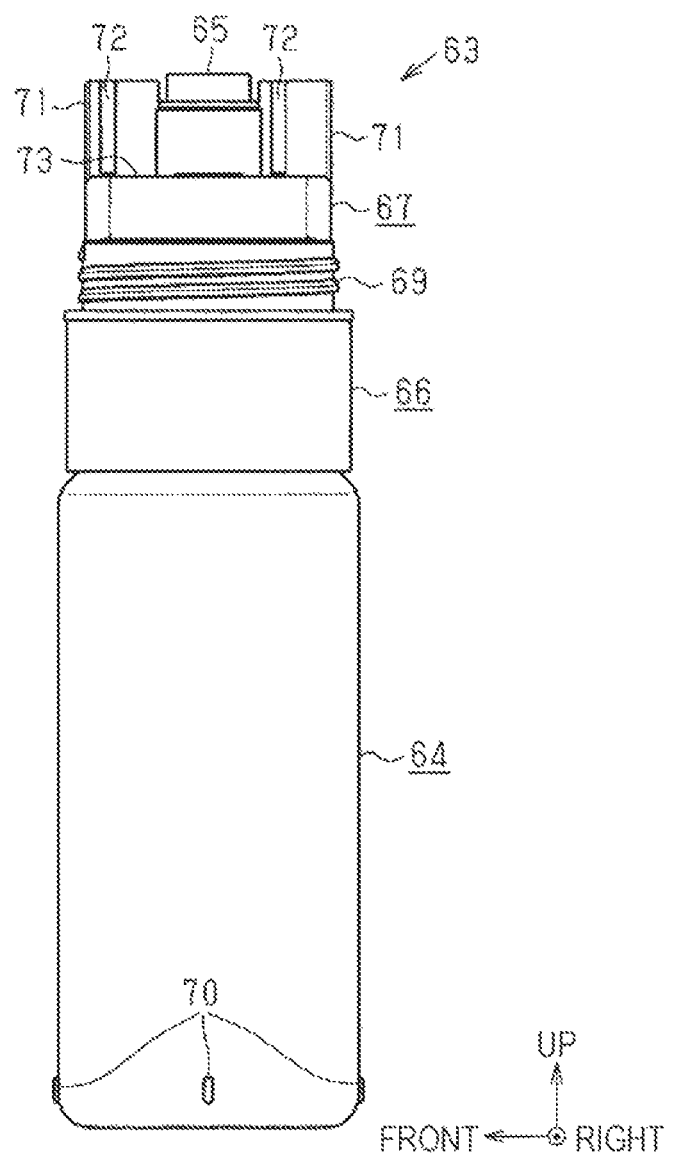
FIG. 7 is a side view of an ink container.
Figure 8:
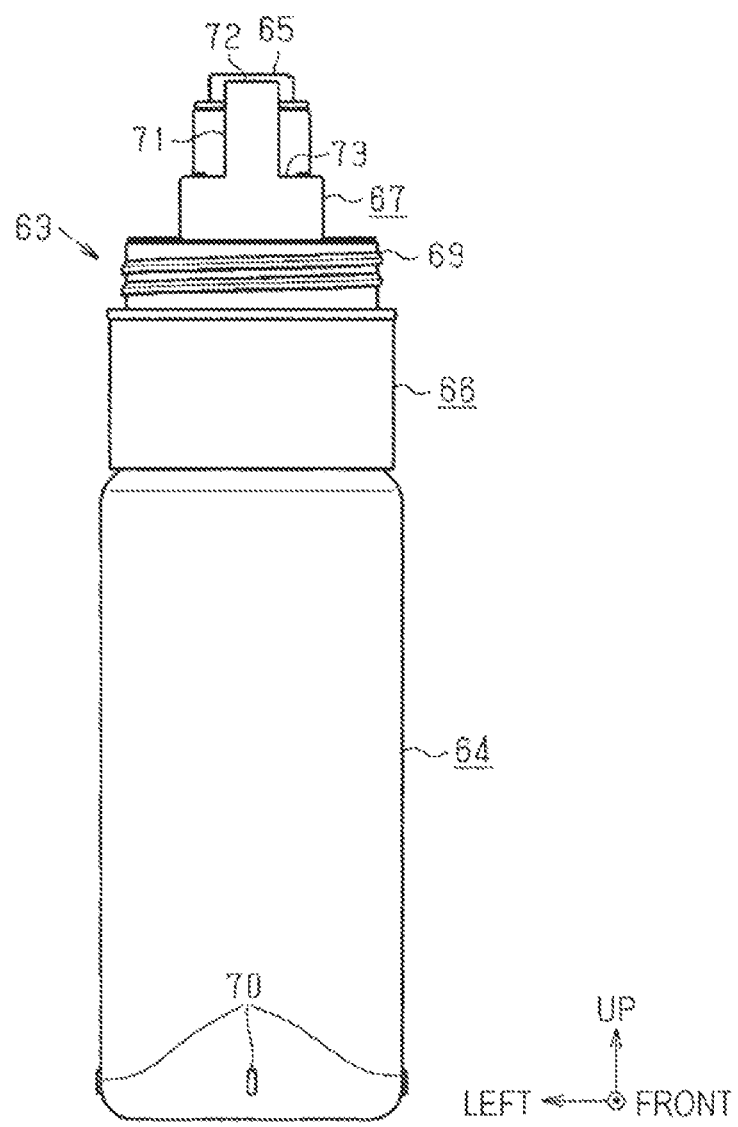
FIG. 8 is a front view of an ink container.

As illustrated in FIG. 6 to FIG. 8, the ink container 63 includes a cylindrical container main body portion 64 serving as a main portion, an ink outlet forming portion 66 provided at a tip portion of the container main body portion 64 and having the ink outlet 65 opened at a tip thereof to allow ink to flow out from the ink container 63, and a container addition portion 67 added to the ink outlet forming portion 66 so as to surround the ink outlet 65. The ink outlet 65 of the ink outlet forming portion 66 including the container addition portion 67 around the ink outlet 65 is covered with a bottomed cylindrical cap 68. Thus, the ink outlet 65 is shut from the outside when the ink container 63 is preserved. That is, a male screw portion 69 is formed on the outer peripheral surface of the cylindrical lower end portion of the container addition portion 67, while a female screw portion (not illustrated) is formed on the inner peripheral surface of the cap 68. By screwing the female screw portion of the cap 68 on the male screw portion 69 of the container addition portion 67, the cap 68 is attached to the tip portion of the ink container 63 to cover the ink outlet 65.

The entire outer surface of the container addition portion 67 is colored in a specific color. That is, the container addition portion 67 is colored in the same color as the color of the ink contained in the container main body portion 64 to which the container addition portion 67 is attached.

Further, as illustrated in FIG. 6 to FIG. 8, a protruding portion 71 is formed in a portion above the cylindrical lower end portion, of the container addition portion 67, in which the male screw portion 69 is formed on the outer peripheral surface thereof. Specifically, the protruding portion 71 is formed in a region outside of the ink outlet 65 in the radial direction with the ink outlet 65 being the center, and protrudes in the upward direction, which is the opposite direction to the container main body portion 64 relative to the ink outlet 65 in the direction of the central axis of the ink outlet 65. When the tip of the needle 56 in the ink inlet 53 side is inserted into the ink outlet 65, the protruding portion 71 functions as a second fitting portion fittable to the recessed portion 61 in the upper surface 58 of the ink replenishment adapter 47 being a first fitting portion. The protruding portions 71 are provided to sandwich the ink outlet 65 from front and rear to make a pair as same as the pair of recessed portions 61 sandwiching the ink inlet 53 from front and rear. As illustrated in FIG. 6 and FIG. 7, in the ink container 63, the protruding portion 71 is formed inside relative to the outer peripheral surface of the container main body portion 64 in the radial direction with the ink outlet 65 being the center.

Figure 9:
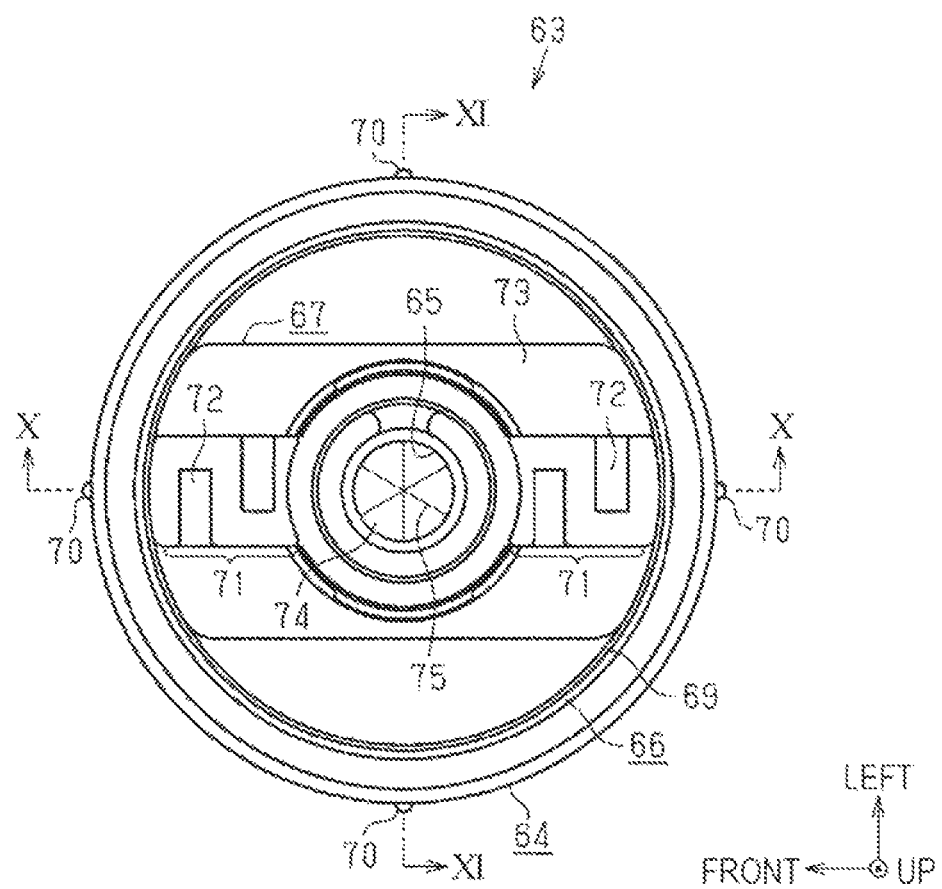
FIG. 9 is a plan view of an ink container.

As illustrated in FIG. 6 and FIG. 9, on the outer surface of each protruding portion 71 (each of right and left side surfaces in FIG. 6 and FIG. 9), there is formed a second uneven portion (second key structure portion) 72 capable of engaging with the first uneven portion (first key structure portion) 62 formed on the inner surface of the recessed portion 61 of the ink replenishment adapter 47. The second uneven portion 72 is provided so as to extend along the protruding direction of the protruding portion 71 (in other words, the direction of the central axis of the ink outlet 65). When the protruding portion 71 is fitted into the recessed portion 61 and the second uneven portion 72 is engaged with the first uneven portion 62, the ink outlet 65 of the ink container 63 is coupled to the ink inlet 53 on the ink tanks 41 to 45 side.

Further, a positioning portion 73 is provided between the cylindrical lower end portion of the container addition portion 67 on which the male screw portion 69 is formed and the protruding portion 71 on which the second uneven portion 72 is formed. The positioning portion 73 has a planar shape orthogonal to (intersecting) the central axis of the ink outlet 65 and is positioned on the outer side in the radial direction of the ink outlet 65 when the ink outlet 65 is viewed in the direction of the central axis thereof. That is, the positioning portion 73 constitutes a part of the outer surface of the container addition portion 67 which is a part of the outer surface of the ink container 63, and is provided at a position in the container main body portion 64 side relative to the tip of the protruding portion 71 in the direction of the central axis of the ink outlet 65. Since the positioning portion 73 is provided to the container addition portion 67 attached to the ink outlet forming portion 66 of the ink container 63, it can be said that the positioning portion 73 is a separate member from the ink outlet forming portion 66 and is provided outside the ink outlet forming portion 66.

As illustrated in FIG. 9, a valve 74 made of an elastic member such as a silicon film is provided in the ink outlet 65 formed in the ink outlet forming portion 66 to seal the ink outlet 65 in a manner capable of opening and closing. The valve 74 is provided at a position where the positioning portion 73 is in the container main body portion 64 side in the direction of the central axis of the ink outlet 65 (see FIG. 14, for example). The valve 74 is provided with a plurality of (three in the present embodiment) slits 75 intersecting at equal angular intervals (intervals of 120 degrees, for example) with the center thereof being the intersection point. The valve 74 is configured to open when the slits 75 are pushed and spread inward from the outside of the ink outlet 65. That is, when the tip of the needle 56 on the ink inlet 53 side is inserted into the ink outlet 65, the valve 74, which is a normally closed valve, is opened by being pushed and spread inward by the tip of the needle 56.

At that time, the positioning portion 73 abuts against the upper surface 58, in which the through-hole 60 including the ink inlet 53 and the recessed portion 61 is formed, of the ink replenishment adapter 47 in the outer side of the ink outlet 65 in the radial direction. Thus, the valve 74 is positioned relative to the ink tanks 41 to 45 in the central axis direction of the ink outlet 65. In this regard, the upper surface 58 of the ink replenishment adapter 47 is a portion on the ink tanks 41 to 45 side against which the positioning portion 73 of the ink container 63 abuts when the valve 74 of the ink outlet 65 of the ink container 63 is opened for ink replenishment to the ink tanks 41 to 45, and functions as the receiving surface that receives the positioning portion 73 having a planar shape.

Figure 10:
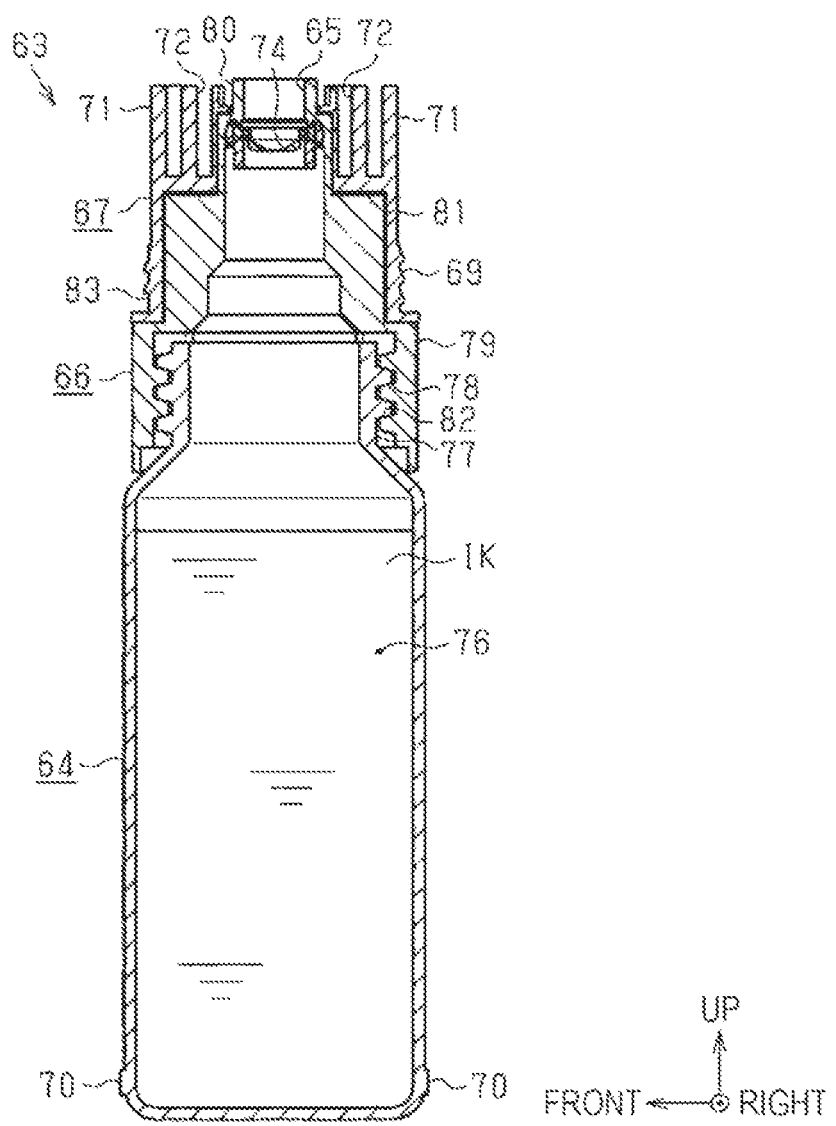
FIG. 10 is a sectional view taken along line X-X in FIG. 9.
Figure 11:
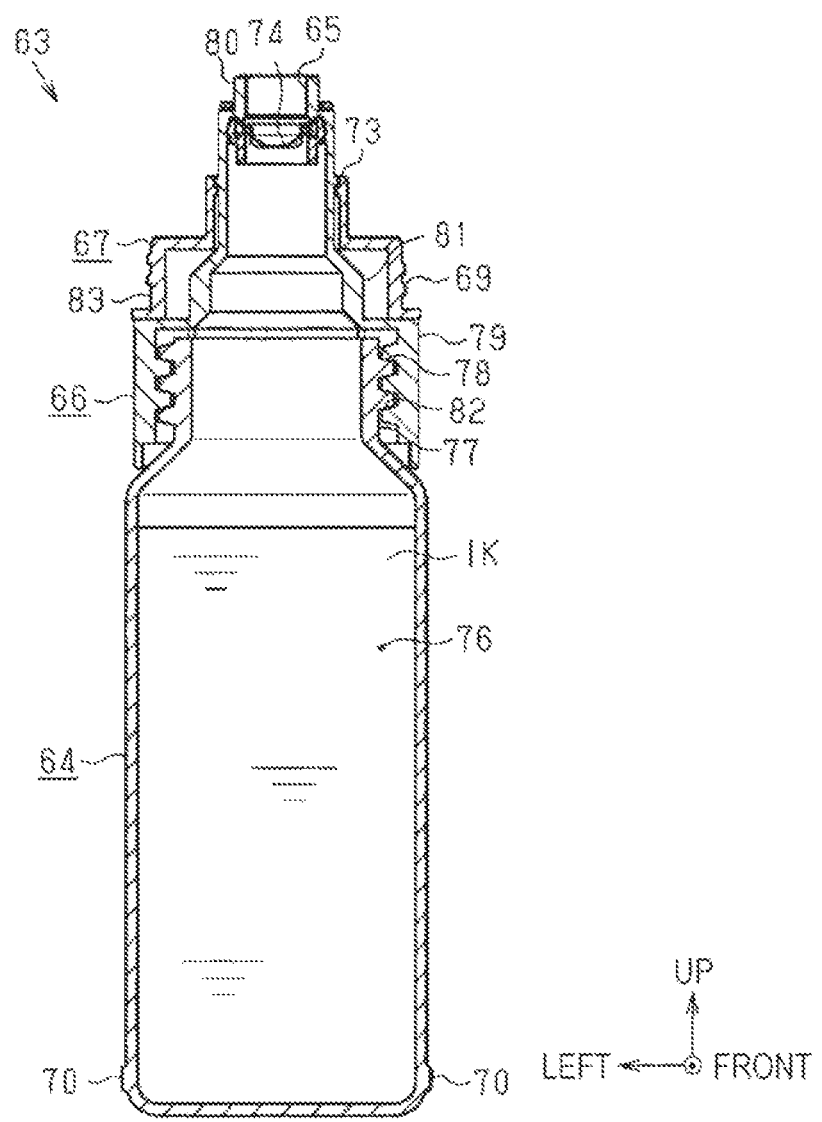
FIG. 11 is a sectional view taken along line XI-XI in FIG. 9.

As illustrated in FIG. 10 and FIG. 11, the container main body portion 64 of the ink container 63 is a bottle-shaped member having an ink containing chamber 76 capable of containing the ink composition IK therein, and a male screw portion 78 is formed on the outer peripheral surface of a neck portion 77 at the upper end portion of the container main body portion 64. Meanwhile, the ink outlet forming portion 66 provided at the upper end portion of the container main body portion 64 has a large-diameter portion 79 positioned on the outer peripheral side of the neck portion 77 of the container main body portion 64, a small-diameter portion 80 forming the ink outlet 65 at a position farthest from the container main body portion 64, and an intermediate portion 81 coupling the large-diameter portion 79 and the small-diameter portion 80. The ink outlet forming portion 66 is attached to the upper end portion of the container main body portion 64 by screwing a female screw portion 82 formed on the inner peripheral surface of the large-diameter portion 79 into the male screw portion 78 formed on the outer peripheral surface of the neck portion 77 of the container main body portion 64.

Further, the container addition portion 67, attached to the ink outlet forming portion 66 of the ink container 63 so as to surround the ink outlet 65, configures a joining portion 83. In the joining portion 83, the lower end surface of the cylindrical lower end portion, which has the male screw portion 69 formed on the outer peripheral surface of the container addition portion 67, is joined with the upper end surface of the large-diameter portion 79 of the ink outlet forming portion 66. The joining portion 83 is joined to the large-diameter portion 79 of the ink outlet forming portion 66 such that surface regions in the front/rear direction of the inner peripheral surface of the joining portion 83 facing each other are in surface contact with the front outer surface and the rear outer surface of the intermediate portion 81 of the ink outlet forming portion 66.

Next, the operation of the ink replenishment system configured as described above will be described below focusing on the operation when the ink is replenished to the ink tanks 41 to 45 of the ink supply unit 40 using the ink container 63.

As a premise, as illustrated in FIG. 2, the ink tank 41 positioned on the rightmost side among the plurality of ink tanks 41 to 45 arranged side by side is the ink tank of the black ink, and the liquid level height of the ink in the ink tank 41 is lowered to the height of the lower limit mark 52 marked on the lower portion of the visible portion 50. Based on the premise, a case in which the ink is replenished to the ink tank 41 will be described below. It is also assumed that the ink container 63 used for the ink replenishment sufficiently contains the black ink, and the cap 68 has been removed from the ink container 63 in advance. Further, the shape of the second uneven portion 72 formed on the outer surface of the protruding portion 71 of the ink container 63 matches the shape of the first uneven portion 62 formed on the inner surface of the recessed portion 61 positioned in front/rear of the ink inlet 53 into the ink tank 41, and the second uneven portion 72 and the first uneven portion 62 can be engaged with each other when the protruding portion 71 is inserted into the recessed portion 61.

When the ink is replenished to the ink tank 41, first, the user rotates the opening/closing door 35 of the housing 22 with the rotation shaft 36 being the center and moves the opening/closing door 35 forward to change the state thereof from a closed state in FIG. 1 to an open state. Then, in the ink supply unit 40, the upper surface 58 of the ink replenishment adapter 47, in which the ink inlets 53 into the ink tanks 41 to 45 are formed, is exposed to the outside of the housing 22, and the user can couple the ink outlet 65 of the ink container 63 to the desired ink inlet 53 from the above.

Figure 12:
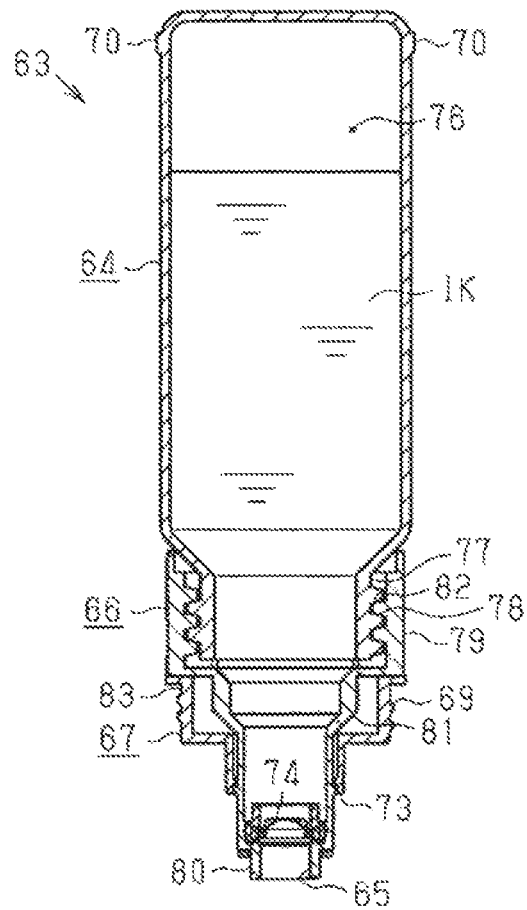
FIG. 12 is a partially broken front view illustrating a state immediately before an ink replenishing operation to an ink tank.
Figure 12:
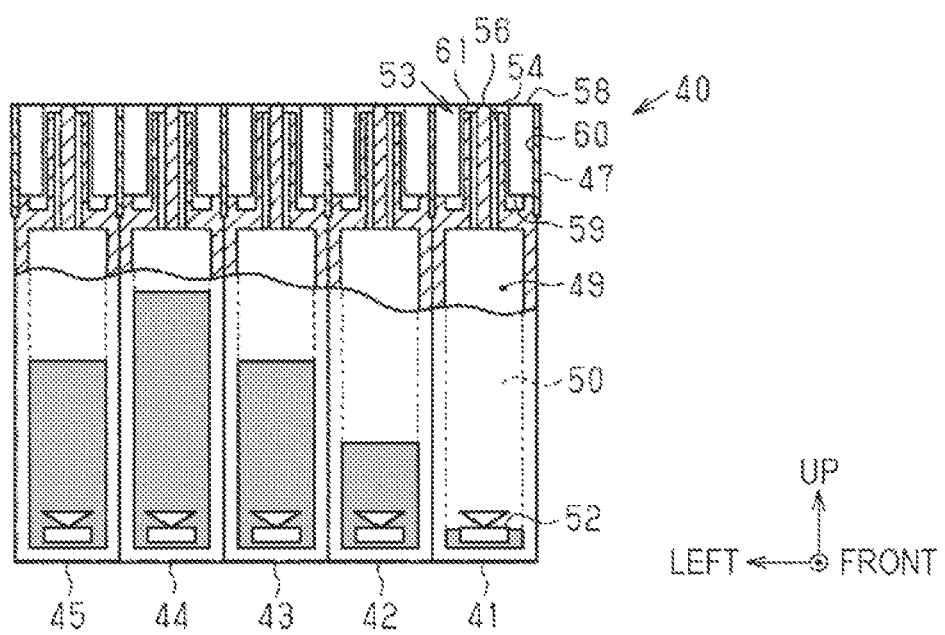
Figure 13:
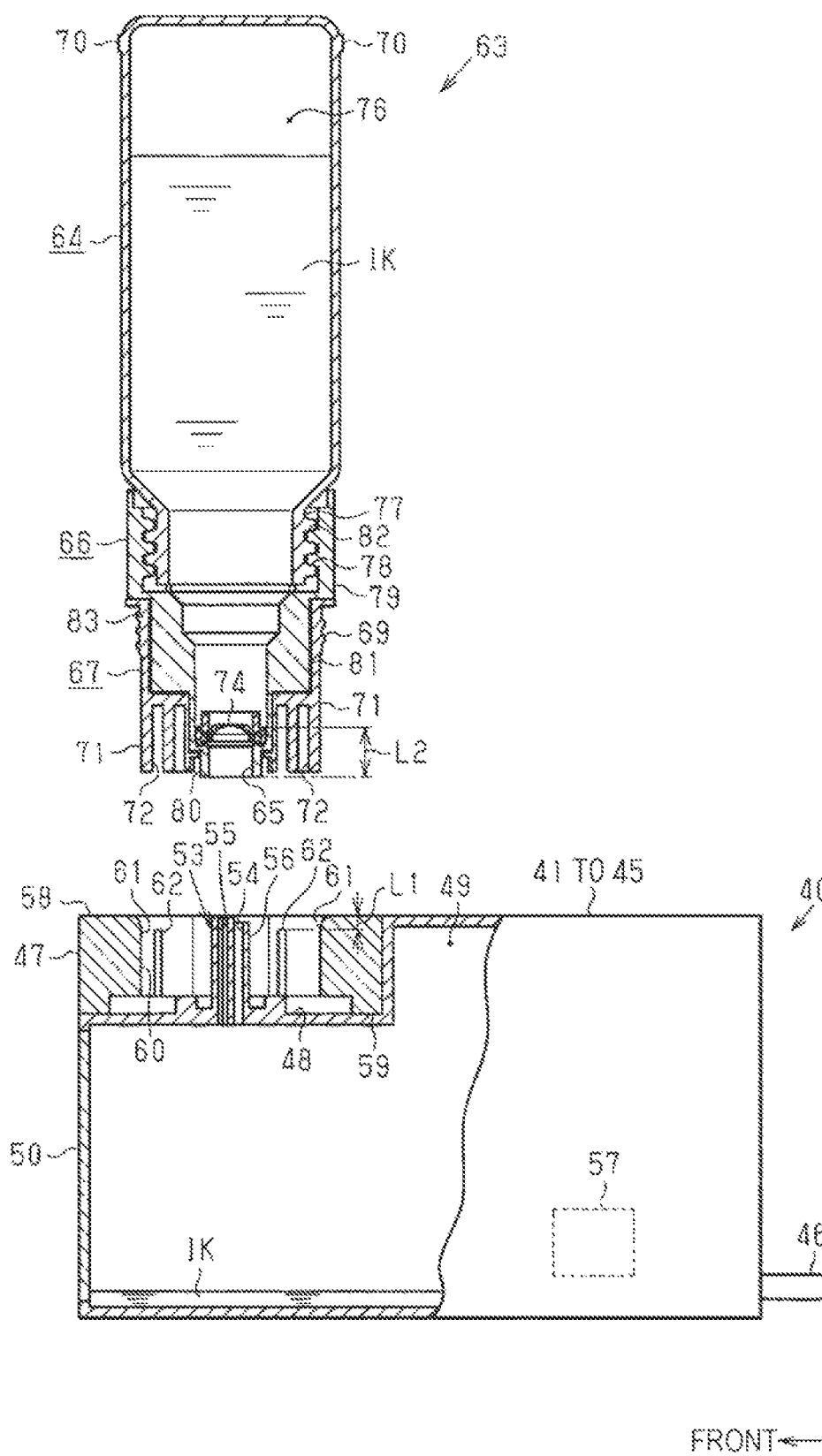
FIG. 13 is a partially broken side view illustrating a state immediately before an ink replenishing operation to an ink tank.

As illustrated in FIG. 12 and FIG. 13, the user turns the ink container 63 containing the ink composition used for the ink replenishment upside down and holds the ink container 63 such that the ink outlet 65 is positioned above the rightmost through-hole 60 of the ink replenishment adapter 47. That is, the central axis of the ink outlet 65 of the ink container 63 is aligned with the central axis of the ink inlet 53 of the ink tank 41 to be replenished with the ink. At this time, the user compares the color of the container addition portion 67 (second portion) of the ink container 63 held in hand with the color of the periphery of the upper opening edge (first portion) of the through-hole 60, which is provided with the ink inlet 53, of the ink tank 41 to be replenished with the ink. When the colors are the same (black in this case), it is confirmed that the ink container 63 suitable for the current ink replenishment is held in hand, and the process proceeds to the subsequent operation for the ink replenishment.

The ink container 63 is lowered from the state illustrated in FIG. 12 and FIG. 13, and the protruding portion 71 of the ink container 63 is inserted into the recessed portion 61 of the ink replenishment adapter 47 integrated with the ink tank 41. Then, the state in which the protruding portion 71 is inserted into the recessed portion 61 is achieved, and the state in which the central axis of the ink outlet 65 coincides with the central axis of the ink inlet 53 is ensured. In this case, since the recessed portions 61 are positioned in point symmetry relative to the needle 56 being the center of the ink inlet 53, the protruding portion 71 may be inserted into either of the recessed portions 61. With this, there is no need to rotate the ink container 63 many times with the central axis of the ink outlet 65 being the center to certify the conformable positional relationship between the recessed portion 61 and the protruding portion 71, and the user may easily insert the protruding portion 71 into the recessed portion 61.

Note that, the protruding portion 71 is slightly inserted into the recessed portion 61 at this time. Also the tip of the needle 56 positioned at the center of the ink inlet 53 is inserted into the opening of the ink outlet 65 slightly protruding from the tip of the protruding portion 71, but does not reach the valve 74 positioned at the inner depth of the ink outlet 65. This is because, as illustrated in FIG. 13, a distance L2 between the tip of the protruding portion 71 and the valve 74 in the ink outlet 65 is longer than a distance L1 between the upper surface 58 of the ink replenishment adapter 47 in which the opening edge of the recessed portion 61 is positioned and the upper end of the first uneven portion 62 in the recessed portion 61. When the protruding portion 71 is further inserted into the downward direction, being the depth direction, of the recessed portion 61, the second uneven portion 72 on the outer surface of the protruding portion 71 engages with the first uneven portion 62 on the inner surface of the recessed portion 61. When the protruding portion 71 is further inserted toward the bottom surface side in the depth direction of the recessed portion 61 while maintaining the engagement state, the tip of the needle 56 of the ink inlet 53 reaches the position of the valve 74 of the ink outlet 65, and opens the valve 74.

Figure 14:
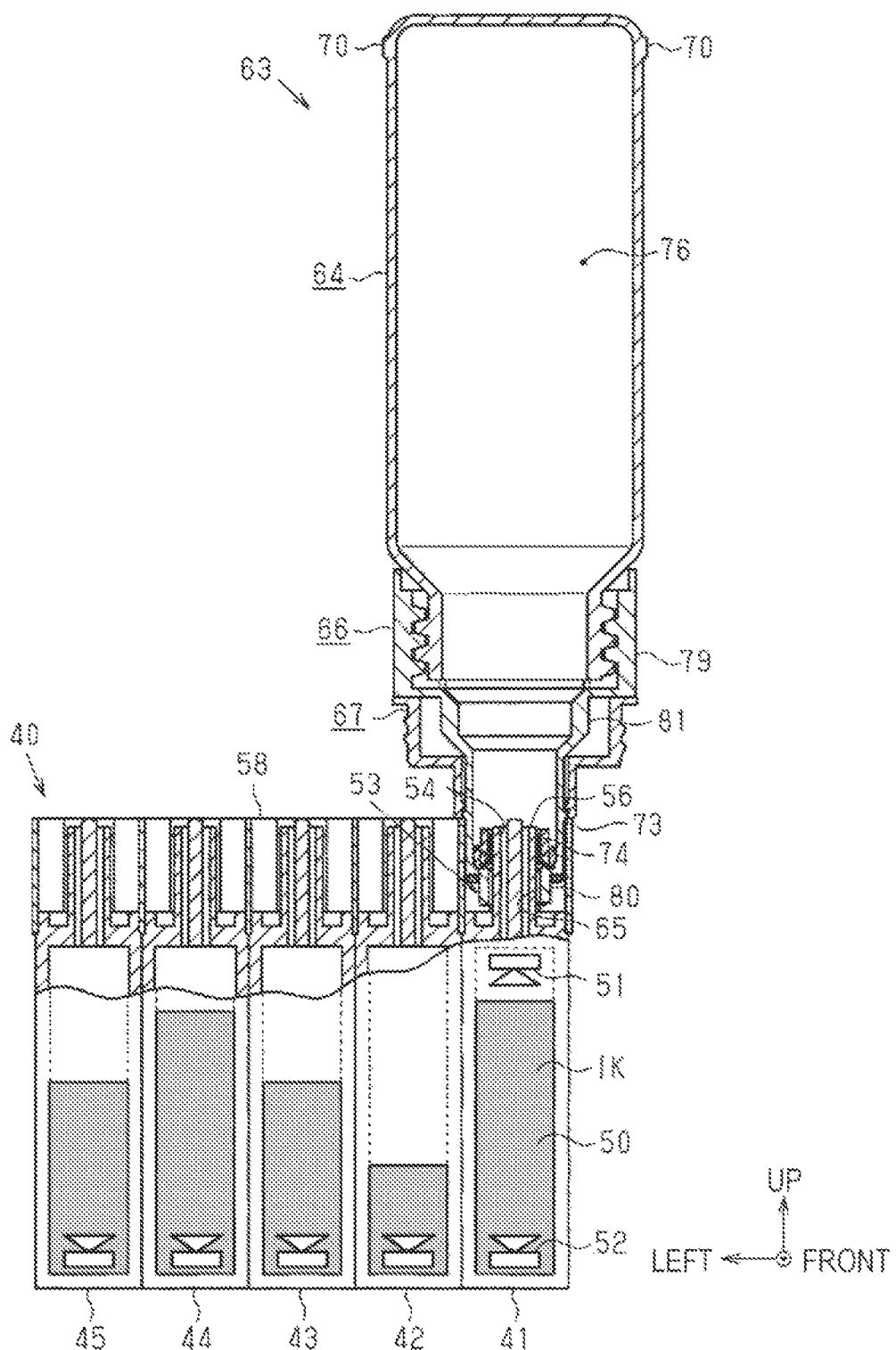
FIG. 14 is a partially broken front view illustrating a state during an ink replenishing operation to an ink tank.
Figure 15:
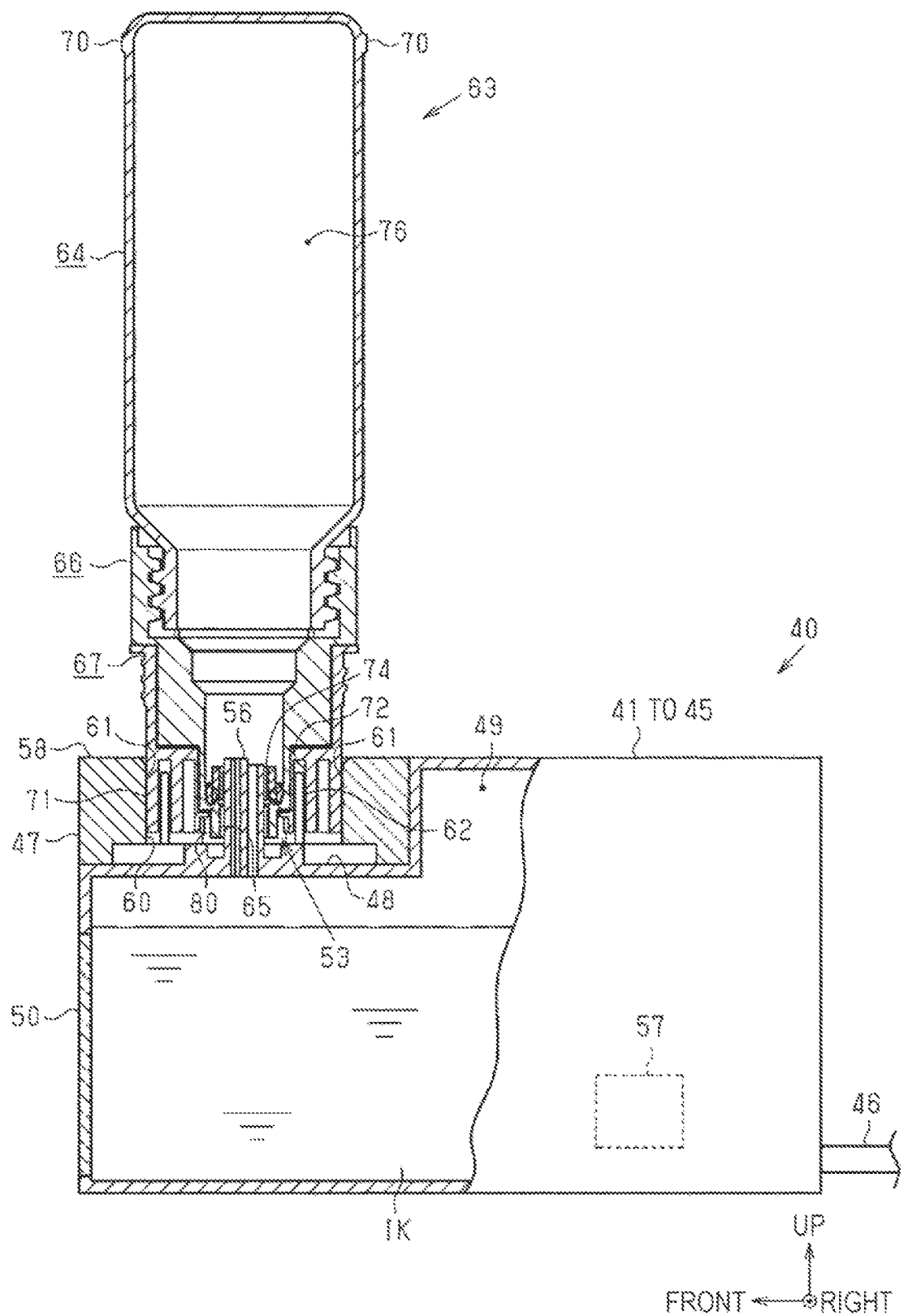
FIG. 15 is a partially broken side view illustrating a state during an ink replenishing operation to an ink tank.

That is, as illustrated in FIG. 14 and FIG. 15, the tip of the needle 56 pushes and spreads the slit 75 of the valve 74 from the lower side to the upper side (that is, from the outer side to the inner side of the ink outlet 65) to open the valve 74. As a result, the ink outlet 65 of the ink container 63 and the needle 56 of the ink inlet 53 of the ink tank 41 are coupled to each other, and the ink composition is replenished from the ink container 63 to the ink tank 41. At this time, in the two flow paths 54 and 55 in the needle 56 of the ink inlet 53, one flow path, in which the tip opening first comes into contact with the ink flowing out from the ink outlet 65 with the valve 74 opened, functions as an ink flow path through which the ink flows, and the other flow path functions as an air flow path through which air flows. For example, when the user attempts to couple the ink outlet 65 to the ink inlet 53 with the ink container 63 being inclined, the flow path serving as the ink flow path of the two flow paths 54 and 55 is changed depending on the difference in the inclination direction.

When the second uneven portion 72 does not engage with the first uneven portion 62 after the protruding portion 71 is inserted into the recessed portion 61, the user can recognize at this moment that the user is attempting to erroneously insert the ink container 63 of a color other than black. In this case, if the upper end of the first uneven portion 62 is positioned at the same height as the opening edge of the recessed portion 61, not only the engagement of the second uneven portion 72 with the first uneven portion 62 is rejected, but also the insertion of the protruding portion 71 into the recessed portion 61 is rejected. This may let the user attempt to insert the protruding portion 71 into the recessed portion 61 several times, and useless working time may unnecessarily be consumed. In this regard, in the present embodiment, since the height of the first uneven portion 62 is lower than the opening edge of the recessed portion 61, the protruding portion 71 is easily guided to the bottom surface side in the depth direction of the recessed portion 61 when the protruding portion 71 is inserted into the recessed portion 61. Thus, it is suppressed that the working time becomes uselessly long.

Figure 16:
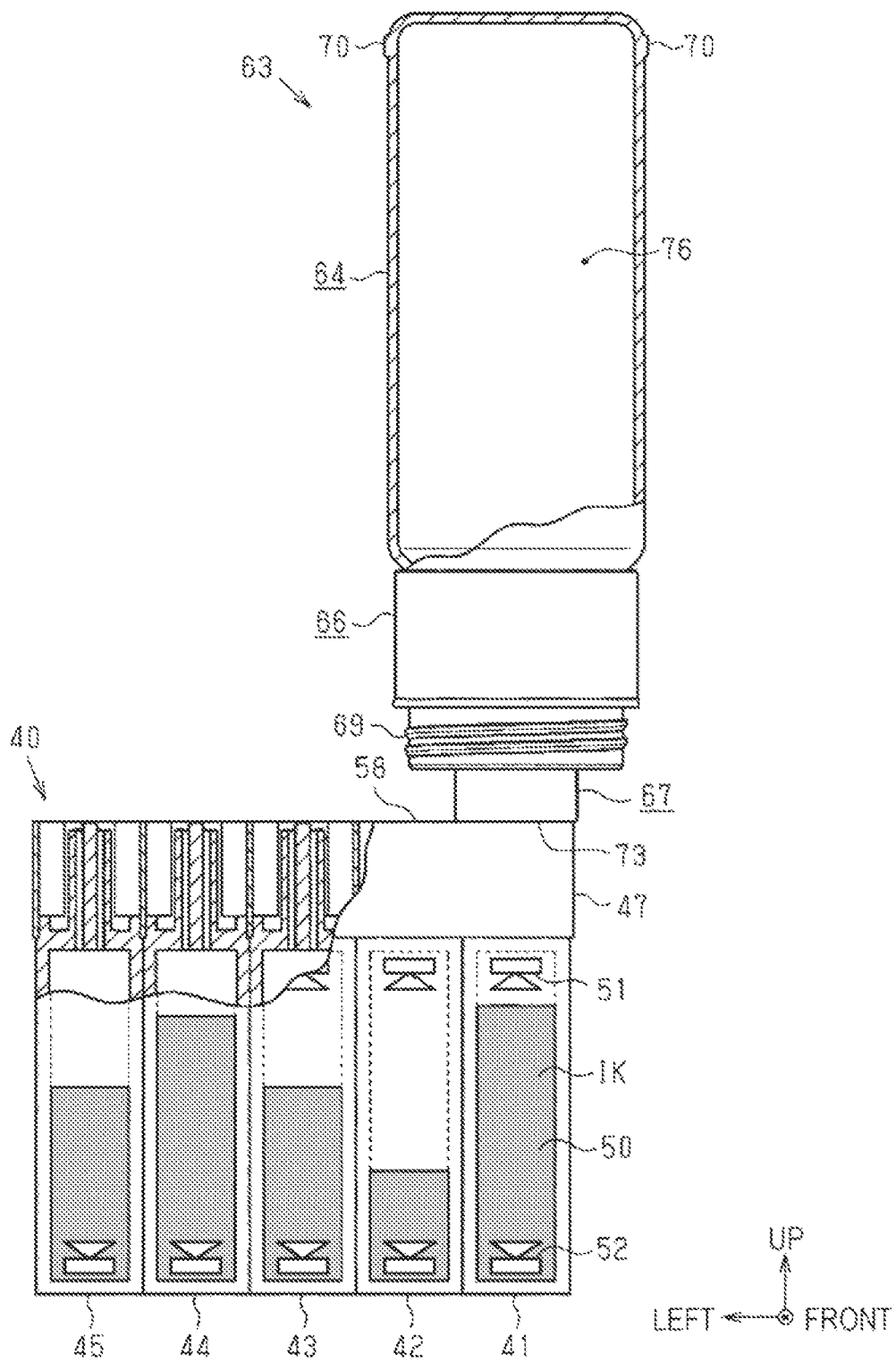
FIG. 16 is a partially broken front view illustrating a state in which a positioning portion of an ink container is abutting against a receiving surface of an ink tank side during an ink replenishing operation.
Figure 17:
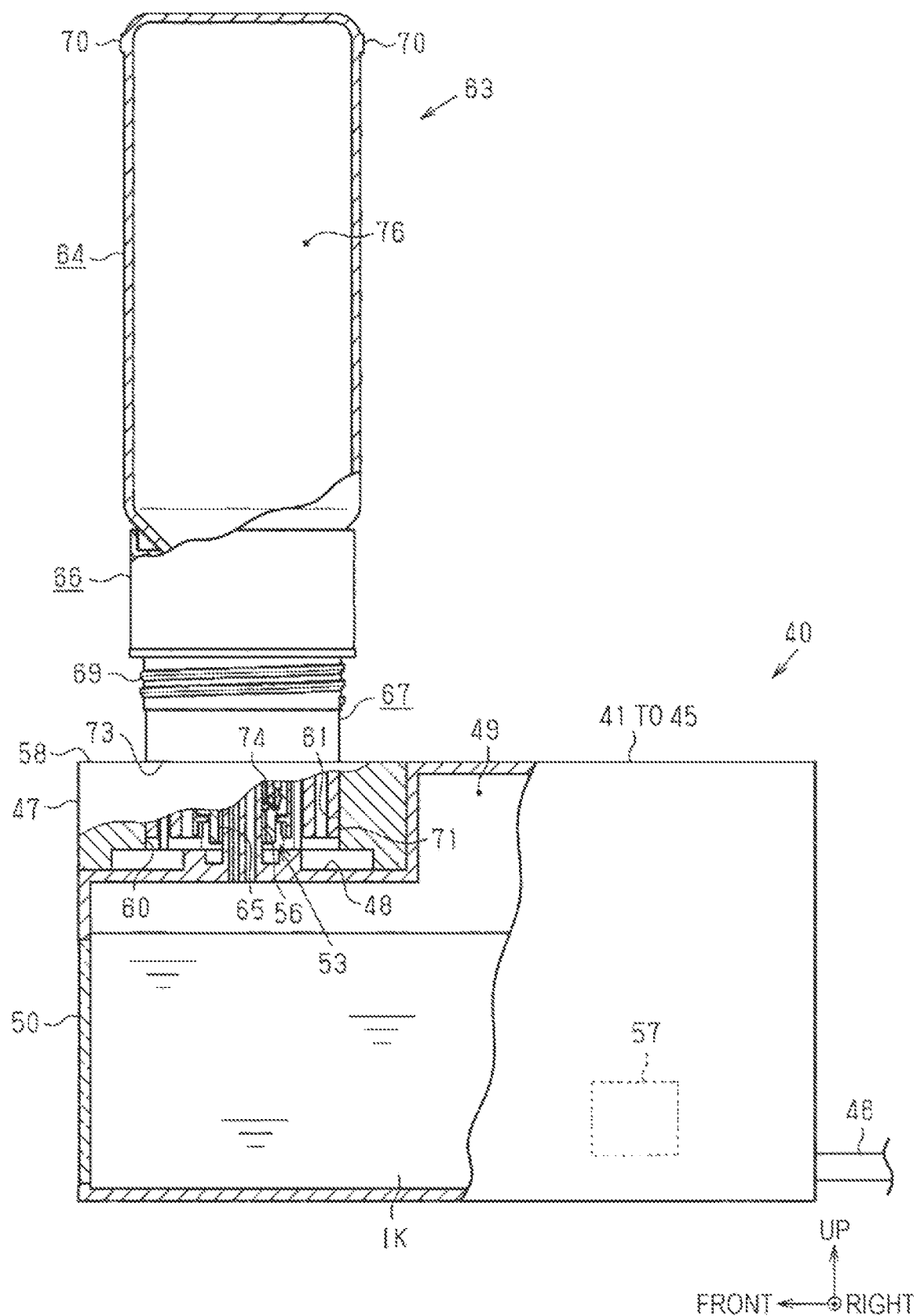
FIG. 17 is a partially broken side view illustrating a state in which a positioning portion of an ink container is abutting against a receiving surface of an ink tank side during an ink replenishing operation.

Further, as illustrated in FIG. 14, FIG. 16 and FIG. 17, when the needle 56 of the ink inlet 53 on the ink tank 41 side opens the valve 74 in the ink outlet 65 of the ink container 63, the positioning portion 73 of the ink container 63 abuts against the upper surface 58, which is a portion on the ink tank 41 side, of the ink replenishment adapter 47. That is, since the positioning portion 73 of the ink container 63 abuts against the upper surface 58 of the ink replenishment adapter 47, the valve 74 is opened in a state that the valve 74 is positioned relative to the needle 56 of the ink tank 41 side in the direction of the central axis of the ink outlet 65.

At this time, since the positioning portion 73 is positioned on the outer side in the radial direction of the ink outlet 65, the posture of the ink container 63 in which the ink outlet 65 is coupled to the ink inlet 53 is stably held. As illustrated in FIG. 14 and FIG. 15, when the positioning portion 73 of the ink container 63 abuts against the upper surface 58 of the ink replenishment adapter 47, there is a gap between the bottom surface of the ink inlet 53 at which the base end of the needle 56 of the ink inlet 53 is positioned and the tip of the ink outlet 65 of the ink container 63. With this, although ink is likely to be accumulated on the bottom surface of the ink inlet 53 at which the base end of the needle 56 is positioned, it may be avoided that the accumulated ink adheres to the tip of the ink outlet 65 and the ink container 63 is stained therewith.

As illustrated in FIG. 14 and FIG. 16, when the ink replenishment from the ink container 63 to the ink tank 41 is completed, in a case that the liquid level height of the ink in the ink tank 41 is still lower than the upper limit mark 51 of the visible portion 50, the ink may further additionally be replenished to the upper limit mark 51 using the ink container 63 of the same black color. The above-described ink replenishment operation is similarly performed for the ink tanks 42 to 45 of other colors other than the ink tank 41 described as containing the black ink.

When the ink set according to the present embodiment is used, for example, in the above-described recording apparatus, each color ink may be preserved being contained in the ink container or a state in which the ink is contained in the ink tank may be left as it is. Even in the case above, the ink set of the present embodiment may maintain preferable preservation stability and ejection stability from a recording head.

2. Examples and Comparative Examples

Hereinafter, the present disclosure will be specifically described with reference to examples, but the present disclosure is not limited to the examples. Hereinafter, "portion" and "%" are based on mass unless otherwise specified. Unless otherwise specified, the following evaluations were performed in the environment of temperature of 25° C. and relative humidity of 40%.

2.1. Preparation of Ink

The ink compositions used for the examples and comparative examples are illustrated in Table 1 and Table 2. The ink was prepared by mixing the components described in Table 1 and Table 2 in an arbitrary order, mixing for 30 minutes or more, and removing such as impurities or foreign substances with filtration or the like as necessary. The method of mixing the respective components is that the materials were sequentially added to a container equipped with a mechanical stirrer, stirred, and mixed. Thereafter, the mixture was filtered through a filter to obtain six kinds of cyan inks, six kinds of magenta inks, six kinds of yellow inks, a black ink, three kinds of light black inks, a light cyan ink, and a light magenta ink. The unit of the numerical values in Table 1 to Table 3 is "% by mass".

TABLE 1

| | Coloring material symbol | Cyan ink | | | | | | Magenta ink | | |
|---|---|---|---|---|---|---|---|---|---|---|
| | | C1 | C2 | C3 | C4 | C5 | C6 | M1 | M2 | M3 |
| Cyan | C-I | 4.5 | 3.0 | — | — | — | 4.5 | — | — | — |
| | C-II | — | — | 3.5 | — | — | — | — | — | — |
| | C-III | — | 1.8 | — | 4.5 | — | — | — | — | — |
| | C-IV | — | — | — | — | 3.5 | — | — | — | — |

TABLE 1-continued

|  |  | C1 | C2 | C3 | C4 | C5 | C6 | M1 | M2 | M3 |
|---|---|---|---|---|---|---|---|---|---|---|
| Magenta | M-I | — | — | — | — | — | — | 1.0 | 1.0 | 0.5 |
|  | M-II | — | — | — | — | — | — | 1.0 | 2.0 | 2.0 |
|  | M-III | — | — | — | — | — | — | 1.0 | 0.5 | 1.2 |
|  | M-IV | — | — | — | — | — | — | — | — | — |
| Yellow | Y-I | — | — | — | — | — | — | — | — | — |
|  | Y-II | — | — | — | — | — | — | — | — | — |
|  | Y-III | — | — | — | — | — | — | — | — | — |
|  | Y-IV | — | — | — | — | — | — | — | — | — |
|  | Y-V | — | — | — | — | — | — | — | — | — |
| Glycerin |  | 10. | 10. | 10. | 10. | 10. | 5. | 10. | 10. | 10. |
| TEG |  | 4.0 | 4.0 | 4.0 | 4.0 | 4.0 | 2.0 | 4.0 | 4.0 | 4.0 |
| TEGmBE |  | 4.0 | 4.0 | 4.0 | 4.0 | 4.0 | 3.0 | 4.0 | 4.0 | 4.0 |
| Newcol 1006-AL |  | 1.0 | 1.0 | 1.0 | 1.0 | 1.0 | 1.0 | 1.0 | 1.0 | 1.0 |
| OLFINE E1010 |  | 1.0 | 1.0 | 1.0 | 1.0 | 1.0 | 1.0 | 1.0 | 1.0 | 1.0 |
| Water |  | Residue | Residue | Residue | Residue | Residue | Residue | Residue | Residue | Residue |
| Maximum absorbance (Abs.) |  | 1.6 | 1.7 | 1.5 | 1.6 | 1.6 | 1.6 | 1.2 | 1.1 | 0.9 |
| Maximum absorption wavelength (nm) |  | 628 | 626 | 616 | 614 | 620 | 628 | 533 | 533 | 534 |
| Full width at half maximum (nm) |  | 141 | 130 | 152 | 113 | 168 | 155 | 92 | 85 | 96 |

|  | Coloring material | Magenta ink | | | Yellow ink | | | | | |
|---|---|---|---|---|---|---|---|---|---|---|
|  | symbol | M4 | M5 | M6 | Y1 | Y2 | Y3 | Y4 | Y5 | Y6 |
| Cyan | C-I | — | — | — | — | — | — | — | — | — |
|  | C-II | — | — | — | — | — | — | — | — | — |
|  | C-III | — | — | — | — | — | — | — | — | — |
|  | C-IV | — | — | — | — | — | — | — | — | — |
| Magenta | M-I | 2.5 | — | 1.0 | — | — | — | — | — | — |
|  | M-II | — | — | 1.0 | — | — | — | — | — | — |
|  | M-III | — | — | 1.0 | — | — | — | — | — | — |
|  | M-IV | — | 3.0 | — | — | — | — | — | — | — |
| Yellow | Y-I | — | — | — | 2.3 | 0.5 | 4.0 | — | 3.5 | 2.3 |
|  | Y-II | — | — | — | 1.5 | — | — | — | — | 1.5 |
|  | Y-III | — | — | — | — | — | — | — | 0.4 | — |
|  | Y-IV | — | — | — | — | — | — | 3.5 | — | — |
|  | Y-V | — | — | — | 0.5 | 3.0 | — | — | — | 0.5 |
| Glycerin |  | 10. | 10. | 5. | 10. | 10. | 10. | 10. | 10. | 5. |
| TEG |  | 4.0 | 4.0 | 2.0 | 4.0 | 4.0 | 4.0 | 4.0 | 4.0 | 2.0 |
| TEGmBE |  | 4.0 | 4.0 | 3.0 | 4.0 | 4.0 | 4.0 | 4.0 | 4.0 | 3.0 |
| Newcol 1006-AL |  | 1.0 | 1.0 | 1.0 | 1.0 | 1.0 | 1.0 | 1.0 | 1.0 | 1.0 |
| OLFINE E1010 |  | 1.0 | 1.0 | 1.0 | 1.0 | 1.0 | 1.0 | 1.0 | 1.0 | 1.0 |
| Water |  | Residue | Residue | Residue | Residue | Residue | Residue | Residue | Residue | Residue |
| Maximum absorbance (Abs.) |  | 1.2 | 1.2 | 1.2 | 1.5 | 1.6 | 1.5 | 1.6 | 1.6 | 1.6 |
| Maximum absorption wavelength (nm) |  | 531 | 539 | 533 | 425 | 409 | 438 | 355 | 448 | 425 |
| Full width at half maximum (nm) |  | 77 | 120 | 98 | 94 | 88 | 98 | 81 | 105 | 95 |

TABLE 2

|  | Coloring material | Black ink | Light black ink | | | Light cyan ink | Light magenta ink |
|---|---|---|---|---|---|---|---|
|  | symbol | B1 | LB1 | LB2 | LB3 | LC | LM |
| Black | B-I | — | 1.0 | — | — | — | — |
|  | B-II | 9.0 | — | 1.0 | 8.0 | — | — |
| Cyan | C-I | — | — | — | — | 2.0 | — |
| Magenta | M-I | — | — | — | — | — | 2.0 |
| Glycerin |  | 10. | 10. | 10. | 10. | 10. | 10. |
| TEG |  | 4.0 | 4.0 | 4.0 | 4.0 | 4.0 | 4.0 |
| TEGmBE |  | 4.0 | 4.0 | 4.0 | 4.0 | 4.0 | 4.0 |
| Newcol 1006-AL |  | 1.0 | 1.0 | 1.0 | 1.0 | 1.0 | 1.0 |
| OLFINE E1010 |  | 1.0 | 1.0 | 1.0 | 1.0 | 1.0 | 1.0 |
| Water |  | Residue | Residue | Residue | Residue | Residue | Residue |
| Maximum absorbance (Abs.) |  | 1.4 | 0.4 | 0.5 | 1.2 | 0.7 | 0.5 |

In Table 1 and Table 2, coloring materials indicated by coloring material symbols are as follows.

C-1: a mixture of a sodium salt of the compound represented by the formula (C-1) above and a lithium salt of the compound represented by the formula (C-2) above C-2: a lithium salt of the compound represented by the formula (C-2) above C-3: a lithium salt of the compound represented by the formula (C-2) above C-4: C.I. Direct Blue 199

M-1: a sodium salt of the compound represented by the formula (M-1) above

M-2: a sodium or an ammonium salt of the compound represented by the formula (M-2) above M-3: a lithium salt of the compound represented by the formula (M-3) above M-4: C.I. Reactive Red 141 Y-1: a sodium salt of the compound represented by the formula (Y-1-1) above Y-2: a mixture of a potassium salt of the compound represented by the formula (Y-2) above and a potassium salt of the compound represented by the formula (Y-3) above Y-3: a lithium salt of the compound represented by the following formula

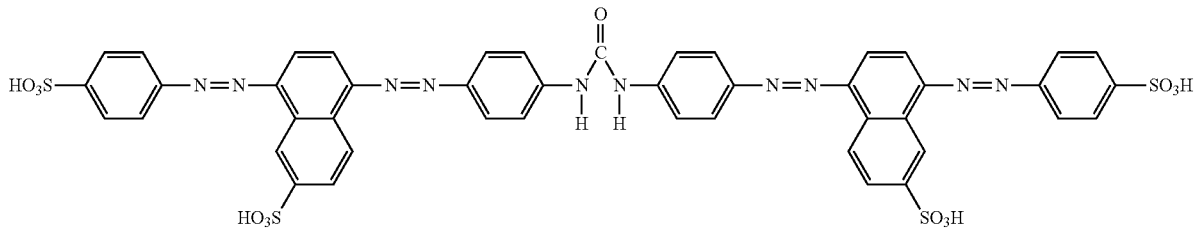 [SMILES: O=C(Nc1ccc(N=Nc2ccc(N=Nc3ccc(S(=O)(=O)O)cc3)c3cc(S(=O)(=O)O)ccc23)cc1)Nc1ccc(N=Nc2ccc(N=Nc3ccc(S(=O)(=O)O)cc3)c3cc(S(=O)(=O)O)ccc23)cc1]

Y-4: the compound represented by the following formula

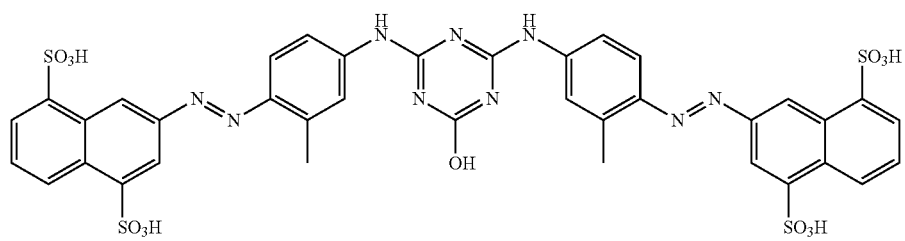 [SMILES: Cc1cc(Nc2nc(O)nc(Nc3ccc(/N=N/c4cc(S(=O)(=O)O)c5cccc(S(=O)(=O)O)c5c4)c(C)c3)n2)ccc1/N=N/c1cc(S(=O)(=O)O)c2cccc(S(=O)(=O)O)c2c1]

Y-5: a sodium salt of the compound represented by the formula (Y-4) above

B-1: a lithium salt of the compound represented by the formula (B-1) above

B-2: a sodium salt of the compound represented by the formula (B-2) above

In Table 1 and Table 2, TEG represents triethylene glycol, and TEGmBE represents triethylene glycol monobutyl ether. Newcol 1006-AL is a polyoxyethylene-based surfactant manufactured by NIPPON NYUKAZAI CO., LTD., and OLFINE E1010 is an acetylene glycol-based surfactant manufactured by Nissin Chemical Industry Co., Ltd.

Table 1 describes the maximum absorbance (Abs.), the maximum absorption wavelength (nm), and the full width at half maximum (nm) of the peak including the maximum absorption wavelength read from the absorption spectrum of each evaluated ink. Table 2 describes the maximum absorbance (Abs.) read from the absorption spectrum of each evaluated ink.

The absorption spectrum of the ink was measured by a spectrum measurement program using the spectrophotometer (V-770, manufactured by JASCO Corporation) and was acquired by attached software (Spectra Manager). As a pretreatment, each color ink is diluted in the following ratio. Cyan (light cyan): 0.5 g/1000 mL, magenta (light magenta): 1.0 g/1000 mL, yellow (light yellow): 1.0 g/1000 mL, black (light black): 0.5 g/1000 mL 2.2. Evaluation Method Printing and evaluation were carried out under the following conditions, and determination was made under the following criteria, and the results are described in Table 3.

TABLE 3

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Cyan ink | C1 | C1 | C1 | C1 | C1 | C1 | C1 | C1 | C1 | C2 | C3 |
| Magenta ink | M1 | M1 | M1 | M1 | M1 | M1 | M2 | M3 | M6 | M1 | M1 |
| Yellow ink | Y1 | Y2 | Y3 | Y1 | Y6 | Y6 | Y1 | Y1 | Y1 | Y1 | Y1 |
| Black ink | B1 | B1 | B1 | B1 | B1 | B1 | B1 | B1 | B1 | B1 | B1 |
| Light ink | LB1 | LB1 | LB1 | LB2 | LB1 | LB1 | LB1 | LB1 | LB1 | LB1 | LB1 |
| CISS tank | Yes | Yes | Yes | Yes | Yes | No | Yes | Yes | Yes | Yes | Yes |
| Color difference with different light sources | A | B | A | A | A | A | B | A | A | B | A |
| Graininess | A | A | B | A | A | A | A | B | A | A | B |
| Water evaporation rate | A | A | A | A | C | B | A | A | C | A | A |
| Fastness (Ozone resistance) | A | A | A | C | A | A | A | A | A | A | A |

| | Example | | Comparative example | | | | | | | |
|---|---|---|---|---|---|---|---|---|---|---|
| | 12 | 13 | 1 | 2 | 3 | 4 | 5 | 6 | 7 | 8 |
| Cyan ink | C6 | C1 | C1 | C1 | C1 | C1 | C4 | C5 | C1 | C1 |
| Magenta ink | M1 | M1 | M1 | M1 | M4 | M5 | M1 | M1 | M1 | M1 |
| Yellow ink | Y1 | Y1 | Y4 | Y5 | Y1 | Y1 | Y1 | Y1 | Y1 | Y1 |
| Black ink | B1 | B1 | B1 | B1 | B1 | B1 | B1 | B1 | B1 | B1 |
| Light ink | LB1 | LC/LM | LB1 | LB1 | LB1 | LB1 | LB1 | LB1 | No | LB3 |
| CISS tank | Yes | Yes | Yes | Yes | Yes | Yes | Yes | Yes | Yes | Yes |
| Color difference with different light sources | A | A | C | A | C | A | C | A | A | A |
| Graininess | A | A | A | C | A | C | A | C | C | C |
| Water evaporation rate | C | A | A | A | A | A | A | A | A | A |
| Fastness (Ozone resistance) | A | A | A | A | A | A | A | A | A | A |

2.2.1. Color Difference with Different Light Sources

A composite black pattern (cyan ink, magenta ink, and yellow ink were ejected in the same amount from Duty 100% to 10% in a changing unit of 5%) was printed using EP-10A (ink jet printer manufactured by Seiko Epson Corporation), and the colorimetry was performed under a D50 light source and a F11 light source, and the value of ΔE was determined under the following criteria. Note that ΔE is a color difference.

A: ΔE≤3%
B: 3%<ΔE≤5%
C: 5%<ΔE 2.2.2. Graininess

A composite black pattern (cyan ink, magenta ink, yellow ink, and light ink were ejected from 1.5 to 0.1 in an OD value in a changing unit of 0.2) was printed using EP-10A (ink jet printer manufactured by Seiko Epson Corporation), and the graininess was determined under the following criteria.

A: Graininess is not recognized in a patch having an OD value of 0.5 or less by visual judgment
B: Graininess is recognized in a patch having an OD value of 0.5 or less, but is not recognized in a patch having an OD value of greater than 0.5 by visual judgment
C: Graininess is recognized in a patch having an OD value of greater than 0.5 by visual judgment 2.2.3. Amount of Water Evaporation Assuming a printer having an off-carriage type ink tank (for example, EW-M770T (ink jet printer manufactured by Seiko Epson Corporation)), an ink tank having a capacity of 60 mL and an elastomer tube having a length of 100 cm and an inner diameter of 1 mm were filled with the ink composition respectively. The amount of water evaporation was measured by weight change of the ink tank and the tube after leaving for 10 days in the environment of temperature of 40° C. and humidity of 20%, and the determination was made under the following criteria. The amount of water evaporation was measured for all evaluated inks used in each example, and the evaluation was made with the average value thereof. In the example without CISS tank, the ink composition was filled into an ink cartridge YTH (ink cartridge for ink jet printer EP-10A manufactured by Seiko Epson Corporation), and the amount of water evaporation was calculated from the weight change of the cartridge after leaving for 10 days in the environment of temperature of 40° C. and humidity of 20%.

A: amount of water evaporation<0.5 g
B: 0.5 g≤amount of water evaporation<1.0 g
C: 1.0 g≤amount of water evaporation 2.2.4 Fastness (Ozone Resistance)

The change rate in the OD value of the sample printed and left under the following conditions was determined as follows.

Machine body: EP-10A (manufactured by Seiko Epson Corporation), EPSON glossy photographic paper Condition: Ozone concentration 5 ppm×80 hours S: OD residual ratio of 85% or more A: OD residual ratio of 70% or more and less than 85%

B: OD residual ratio of less than 70%

2.3. Evaluation Result

The ink set of each example satisfying the following conditions had a preferable evaluation result in both of color difference with different light sources and graininess. The ink set of each example includes: a yellow ink having the maximum value of the peak of the maximum absorption wavelength in a range from 350 nm to 480 nm and having the full width at half maximum of the peak including the maximum absorption wavelength in a range from 85 nm to 100 nm, a magenta ink having the maximum value of the peak of the maximum absorption wavelength in a range from 510 nm to 560 nm and having the full width at half maximum of the peak including the maximum absorption wavelength in a range from 85 nm to 100 nm, a cyan ink having the maximum value of the peak of the maximum absorption wavelength in a range from 580 nm to 700 nm and having the full width at half maximum of the peak including the maximum absorption wavelength in a range from 118 nm to 165 nm, and a light ink in which the maximum absorbance in the visible light wavelength range thereof is 70% or less of the maximum absorbance in the visible light wavelength range of the corresponding process color ink. Whereas, in comparative examples not satisfying the above conditions, the color difference with different light sources and the graininess were not evaluated as preferable at the same time.

The above-described embodiment is merely an example, and the present disclosure is not limited thereto. For example, the embodiment and modifications thereof may appropriately be combined.

The present disclosure includes a configuration substantially the same as the configuration described in the embodiment, for example, a configuration having the same function, method, and result, or a configuration having the same object and effect. Further, the present disclosure includes a configuration in which a non-essential portion of the configuration described in the embodiment is replaced. Further, the present disclosure includes a configuration having the same operational effect as the configuration described in the embodiment or a configuration capable of achieving the same object. Further, the present disclosure includes a configuration in which a known technique is added to the configuration described in the embodiment.

The following conclusions are derived from the above-described embodiment.

The ink set includes a process color ink set including a yellow ink, a magenta ink, a cyan ink, and a black ink as process color inks, and a light ink having a color similar to a corresponding one of the process color inks of the process color ink set. The yellow ink has the maximum value of the peak of the maximum absorption wavelength in a range from 350 nm to 480 nm, the magenta ink has the maximum value of the peak of the maximum absorption wavelength in a range from 510 nm to 560 nm, and the cyan ink has the maximum value of the peak of the maximum absorption wavelength in a range from 580 nm to 700 nm. The yellow ink has the full width at half maximum of the peak including the maximum absorption wavelength in a range from 85 nm to 100 nm, the magenta ink has the full width at half maximum of the peak including the maximum absorption wavelength in a range from 85 nm to 100 nm, and the cyan ink has the full width at half maximum of the peak including the maximum absorption wavelength in a range from 118 nm to 165 nm. The light ink has the maximum absorbance in the visible light wavelength range of 70% or less of the maximum absorbance in the visible light wavelength range of the corresponding one of the process color inks.

With the use of this ink set, it is possible to form an image with the reduced color difference with different light sources and the suppressed graininess. That is, since the range of the maximum value of the peak of the maximum absorption wavelength of each color ink in the process color ink set is appropriate and the peak of the maximum absorption wavelength has the sufficiently large full width at half maximum, the color difference with different light sources may be reduced. Further, since the contour of the dot formed on the recording medium may be made obscure by the light ink, an image with suppressed graininess may be formed.

The above-described ink set is used in a recording apparatus. The recording apparatus includes a filling port capable of opening/closing, a liquid containing portion containing a liquid, and a recording head ejecting the liquid. In the recording apparatus, the liquid is contained in a container separate from the recording apparatus, the liquid containing portion is filled with the liquid from the container via the liquid filling port, and the container is coupled to the recording apparatus only when the liquid containing portion is filled with the liquid. In the above-described ink set used in the recording apparatus above, the liquid may be the process color inks or the light ink.

With the use of this ink set, it is possible to further improve the preservation stability when the ink is contained in the container, the preservation stability when the ink is contained in the liquid containing portion, and the ejection stability when the ink is ejected from the recording head.

In any of the ink sets described above, each of the process color inks and the light ink included in the ink set may contain a polyhydric alcohol having a boiling point of 270° C. or higher in an amount of 8.0% by mass or more relative to the total amount of the ink.

With the use of this ink set, evaporation of water in each color ink may be suppressed. As a result, the concentration of the ink is suppressed, and the graininess in a formed image may further be suppressed.

In any of the ink sets described above, the light ink may be a light black ink containing the compound represented by the following formula (B-1) or a salt thereof in an amount of 0.5% by mass or more relative to the total amount of the ink.

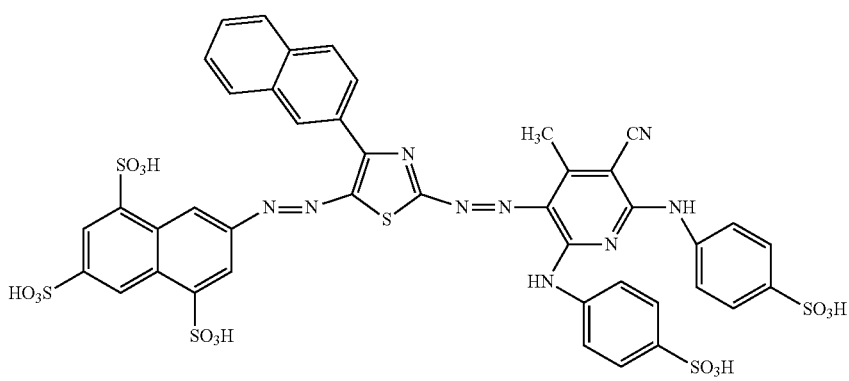
(B-1)

With the use of this ink set, an image with preferable ozone-resistant fastness may be formed.

In any of the ink sets described above, the yellow ink may contain the compound represented by the following formula (Y-1) or a salt thereof.

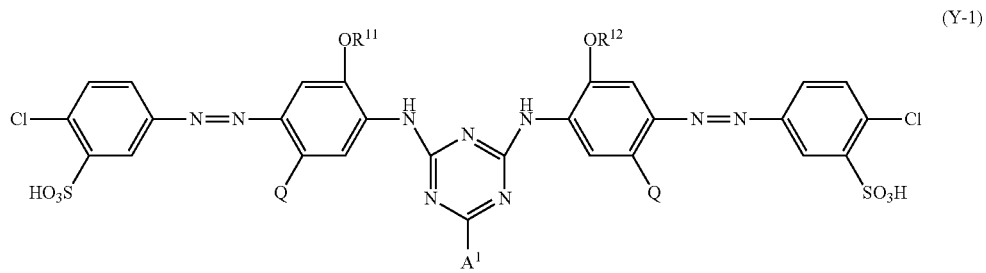
(Y-1)

[In the formula (Y-1), each Q independently represents a halogen atom, and each of $R^{11}$ and $R^{12}$ independently represents an alkyl group substituted with an ionic hydrophilic group. $A^1$ represents a group represented by the following formula (A1-1), a C1-C3 alkoxy-substituted alkylamino group, a mono-C1-C6 alkyl-substituted amino group, a mono-C2-C6 alkyl-substituted amino group having two or more hydroxyl groups, or a cyclic amine group.]

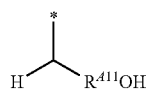
(A1-1)

[In the formula (A1-1), $R^{411}$ represents a branched alkylene group, and represents the bonding position with a triazine ring.]

With the use of this ink set, the color difference with different light sources of an image may further be reduced.

In any of the ink sets described above, the cyan ink may contain a compound containing a copper phthalocyanine skeleton or a salt thereof.

With the use of this ink set, the color difference with different light sources of an image may further be reduced.

What is claimed is:

1. An ink set comprising:
   a process color ink set including a yellow ink, a magenta ink, a cyan ink, and a black ink as process color inks; and
   a light ink having a color similar to a corresponding one of the process color inks in the process color ink set, wherein
   the yellow ink has a maximum absorption wavelength in a range from 350 nm to 480 nm,
   the magenta ink has a maximum absorption wavelength in a range from 510 nm to 560 nm,
   the cyan ink has a maximum absorption wavelength in a range from 580 nm to 700 nm,
   a full width at half maximum of a peak including the maximum absorption wavelength of the yellow ink is in a range from 85 nm to 100 nm,
   a full width at half maximum of a peak including the maximum absorption wavelength of the magenta ink is in a range from 85 nm to 100 nm,
   a full width at half maximum of a peak including the maximum absorption wavelength of the cyan ink is in a range from 118 nm to 165 nm,
   a maximum absorbance in a visible light wavelength range of the light ink is 70% or less of a maximum absorbance in the visible light wavelength range of the corresponding one of the process color inks,
   the yellow ink contains a compound represented by the formula (Y-4) or a salt thereof, and
   the light ink is a light black ink containing a compound represented by formula (B-1) or a salt thereof in an amount of 0.5% by mass or more relative to a total amount of ink

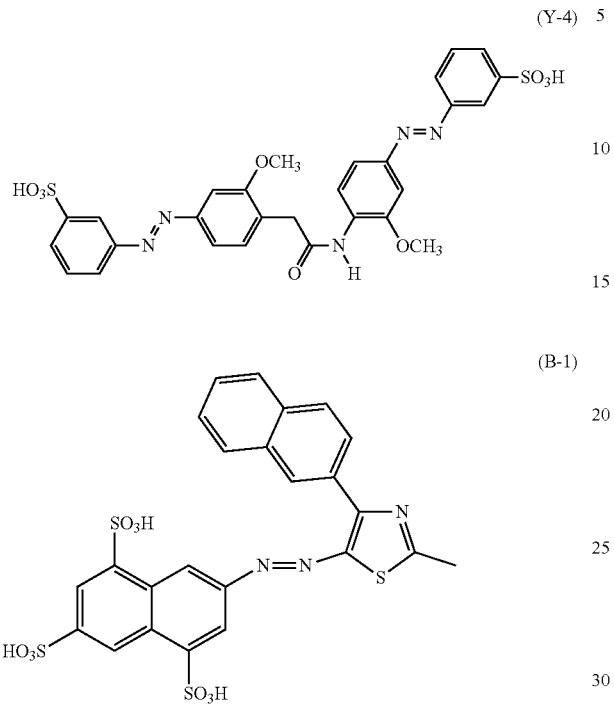

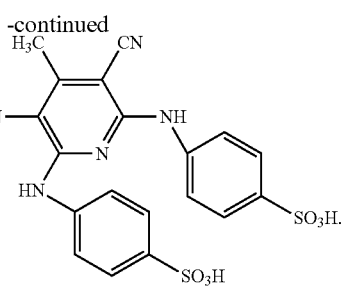

2. The ink set according to claim 1, wherein
the ink set is used in a recording apparatus which includes a filling port configured to open and close, a liquid containing portion containing a liquid, and a recording head ejecting the liquid, and in which the liquid is contained in a container separate from the recording apparatus, the liquid containing portion is filled with the liquid from the container via the liquid filling port, and the container is coupled to the recording apparatus only when the liquid containing portion is filled with the liquid, and
the liquid is the process color inks or the light ink.

3. The ink set according to claim 1, wherein
each of the process color inks and the light ink included in the ink set contains a polyhydric alcohol having a boiling point of 270° C. or higher in an amount of 8.0% by mass or more relative to a total amount of ink.

4. The ink set according to claim 1, wherein
the cyan ink contains a compound containing a copper phthalocyanine skeleton or a salt thereof.

* * * * *